United States Patent
Letsky

(10) Patent No.: US 8,428,776 B2
(45) Date of Patent: Apr. 23, 2013

(54) METHOD FOR ESTABLISHING A DESIRED AREA OF CONFINEMENT FOR AN AUTONOMOUS ROBOT AND AUTONOMOUS ROBOT IMPLEMENTING A CONTROL SYSTEM FOR EXECUTING THE SAME

(76) Inventor: Michael Todd Letsky, Boca Raton, FL (US)

( * ) Notice: Subject to any disclaimer, the term of this patent is extended or adjusted under 35 U.S.C. 154(b) by 179 days.

(21) Appl. No.: 12/818,590

(22) Filed: Jun. 18, 2010

(65) Prior Publication Data
US 2010/0324731 A1    Dec. 23, 2010

Related U.S. Application Data

(60) Provisional application No. 61/218,279, filed on Jun. 18, 2009.

(51) Int. Cl.
*G06F 19/00* (2011.01)
(52) U.S. Cl.
USPC .................................................. 700/245
(58) Field of Classification Search .................. 700/245
See application file for complete search history.

(56) References Cited

U.S. PATENT DOCUMENTS

| | | | |
|---|---|---|---|
| 5,204,814 A | 4/1993 | Noonan et al. | |
| 5,974,347 A | 10/1999 | Nelson | |
| 6,255,793 B1* | 7/2001 | Peless et al. | 318/580 |
| 6,339,735 B1 | 1/2002 | Peless et al. | |
| 6,417,641 B2 | 7/2002 | Peless et al. | |
| 6,493,613 B2 | 12/2002 | Peless et al. | |
| 7,103,457 B2 | 9/2006 | Dean | |
| 7,107,132 B2 | 9/2006 | Dean | |
| 7,117,660 B1 | 10/2006 | Colens | |
| 7,239,944 B2 | 7/2007 | Dean | |
| 8,019,475 B2* | 9/2011 | Kuroda | 700/255 |
| 8,234,848 B2 | 8/2012 | Messina et al. | |
| 2003/0030398 A1* | 2/2003 | Jacobs et al. | 318/568.12 |
| 2004/0010343 A1 | 1/2004 | Dean | |
| 2008/0109126 A1 | 5/2008 | Sandin et al. | |
| 2009/0044370 A1* | 2/2009 | Won et al. | 15/319 |
| 2010/0106356 A1* | 4/2010 | Trepagnier et al. | 701/25 |
| 2012/0212638 A1 | 8/2012 | Schepelmann et al. | |

FOREIGN PATENT DOCUMENTS

| | | |
|---|---|---|
| EP | 0774702 | 5/1997 |
| EP | 1721279 | 2/2008 |
| EP | 2260690 | 12/2010 |
| EP | 2330473 | 6/2011 |

* cited by examiner

*Primary Examiner* — James Trammell
*Assistant Examiner* — Michael D Lang
(74) *Attorney, Agent, or Firm* — The Belles Group, P.C.

(57) ABSTRACT

A method of establishing an area of confinement and an autonomous robot for performing a task within the area of confinement. In one aspect, the invention can be a method of defining an area of confinement comprising: positioning the autonomous robot at a starting point $P_0$ and recording the starting point $P_0$ as a reference point within a memory device; moving the autonomous robot from the starting point $P_0$ about a perimeter of the area of confinement, wherein said movement of the autonomous robot is controlled by a user; continuously tracking location of the autonomous robot relative to the reference point $P_0$ during said movement using a distance-traveled measuring mechanism and a directional indicating instrument; recording the tracked location as a map in the memory device; and upon detecting that the map includes a closed-geometry, defining the closed-geometry as the perimeter of the area of confinement within the memory device.

20 Claims, 44 Drawing Sheets

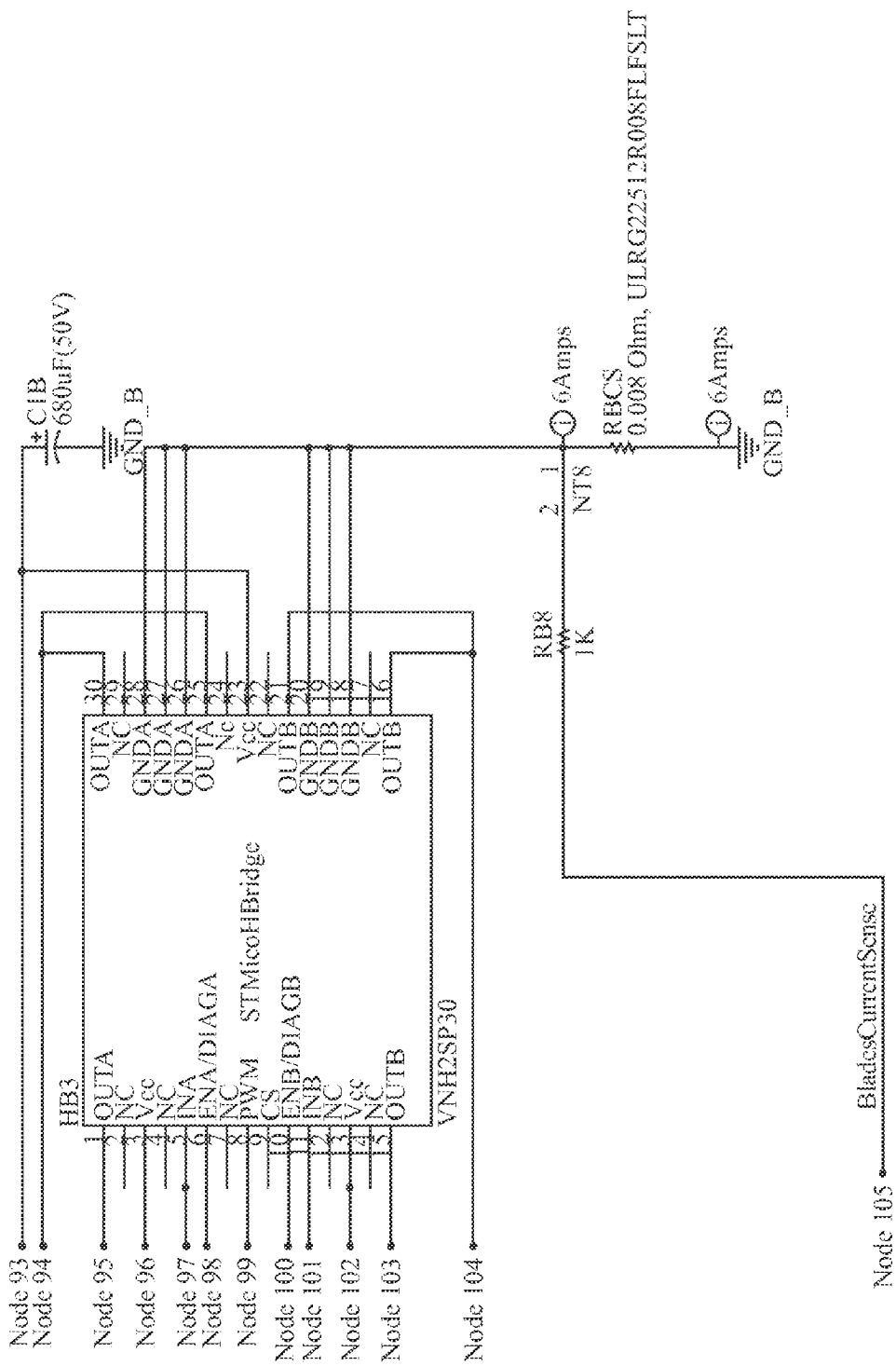

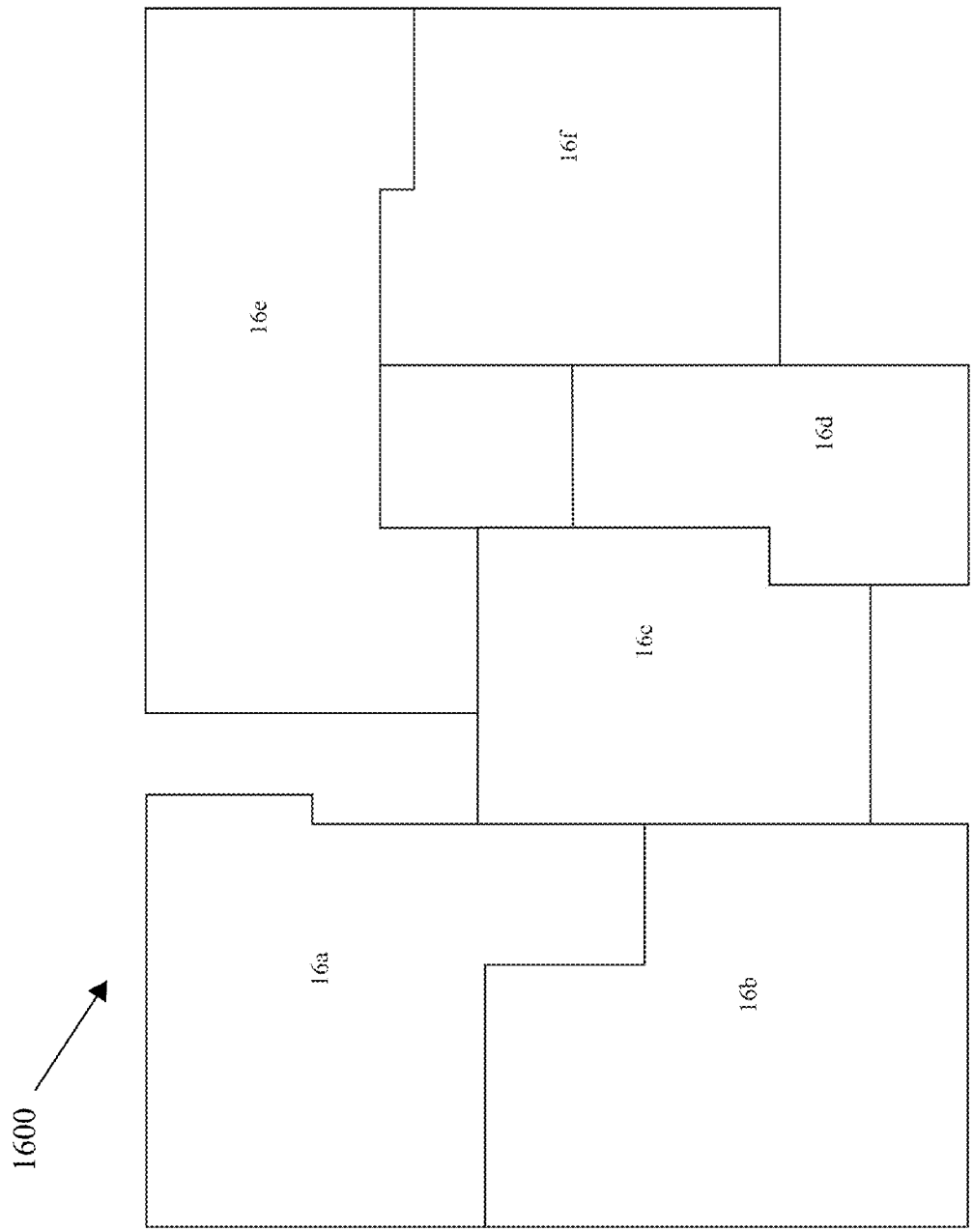

METHOD FOR ESTABLISHING A DESIRED AREA OF CONFINEMENT FOR AN AUTONOMOUS ROBOT AND AUTONOMOUS ROBOT IMPLEMENTING A CONTROL SYSTEM FOR EXECUTING THE SAME

CROSS-REFERENCE TO RELATED APPLICATION

The present application claims the benefit of U.S. Provisional Patent Application Ser. No. 61/218,279, filed Jun. 18, 2009, the entirety of which is hereby incorporated by reference.

FIELD OF THE INVENTION

This invention relates to the field of autonomous robots and, specifically to mobile robots that are designed to perform tasks within a bounded area, such as for performing cleaning or lawn mowing tasks.

BACKGROUND OF THE INVENTION

Autonomous robots that perform household functions such as floor cleaning and lawn mowing are now readily available consumer products. As found in the industry and elsewhere, numerous attempts have been made to build lawn mowing robots. Each of these robots has faced a similar challenge: how to define the bounding area with minimal effort and efficiently cover the designated area given limited energy reserves.

Commercially successful robots tend to be unnecessarily complex and generally operate randomly within a confined area. When dealing with a lawn, existing autonomous robots utilize a physically defined perimeter to define the area of confinement. Examples of physically defined perimeters include a perimeter wire, reflectors, beacons and/or structural barriers, such as a fence. When all aspects of the confinement system are operating properly, these robots perform their respective tasks within the area of confinement.

In existing technologies, problems may arise with the physically defined perimeter, thereby enabling the autonomous robot to leave the desired area of confinement. Failures in physically defined perimeters may include a broken perimeter wire or a small opening or hole in a fence. Among other things, these failures can lead to a damaged robot, injury to an unsuspecting person, or failed coverage.

The performance of lawn mowing robots should concentrate on four measures of success: ease of use, coverage, mowing rate, and perceived effectiveness. As described above, if an autonomous robot is able to leave the desired area of confinement, the coverage will obviously not be optimal. Furthermore, existing technologies require the installation of a physical barrier, possibly including burying a perimeter wire around the desired area. This is not the easiest possible use of an autonomous robot designed to be contained in a bounded area for lawn mowing.

Thus, a need exists for an autonomous robot that can perform a task within a confined area that is defined without the use of a physically defined barrier.

SUMMARY OF THE INVENTION

The present invention is directed to an autonomous robot that performs a task within a designated area such that the autonomous robot does not require the use of physical means, such as perimeter wires, beacons, structures or the like in order to maintain the autonomous robot within the designated area.

In one aspect, the invention can be a method of defining an area of confinement for an autonomous robot comprising: a) positioning the autonomous robot at a starting point $P_0$ and recording the starting point $P_0$ as a reference point within a memory device of the autonomous robot; b) moving the autonomous robot from the starting point $P_0$ about a perimeter of the area of confinement in a desired direction, wherein said movement of the autonomous robot is controlled by a user; c) continuously tracking location of the autonomous robot relative to the reference point $P_0$ during said movement using a distance-traveled measuring mechanism and a directional indicating instrument; d) recording the tracked location of the autonomous robot as a map in the memory device; and e) upon detecting that the map includes a closed-geometry, defining the closed-geometry as the perimeter of the area of confinement within the memory device.

In another aspect, the invention can be an autonomous robot comprising: a housing, a control system, and a plurality of drive wheels, the control system comprising a distance-traveled measuring mechanism, a directional indicating instrument, a memory device, a data receiving port for receiving signals from an external device, and a central processing unit; and the central processing unit configured to: (1) track the location of the autonomous robot relative to a reference point based on output generated by the distance-traveled measuring mechanism and the directional indicating instrument during user-controlled movement of the autonomous robot; (2) record the tracked location of the autonomous robot as a map within the memory device; and (3) define a closed-geometry formed by the tracked location as a perimeter of the area of confinement within the memory device.

DETAILED DESCRIPTION OF THE INVENTION

Figure 1:
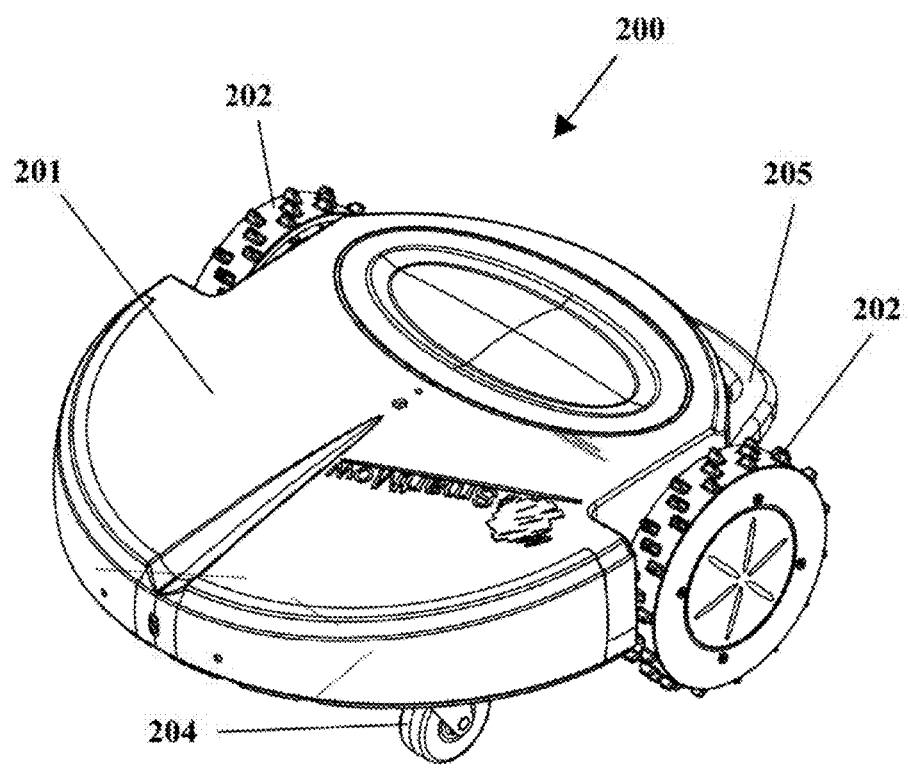
FIG. 1 is a perspective view of an autonomous robot for cutting lawns according to one embodiment of the present invention.
Figure 2:
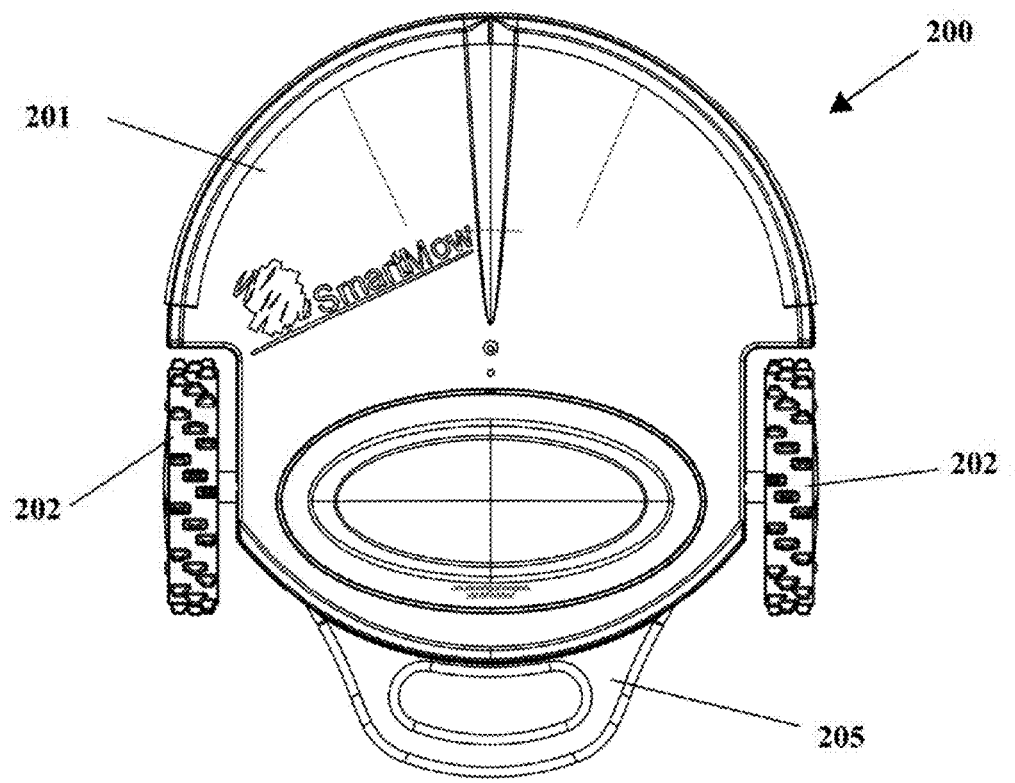
FIG. 2 is a top view of the autonomous robot of FIG. 1.
Figure 3:
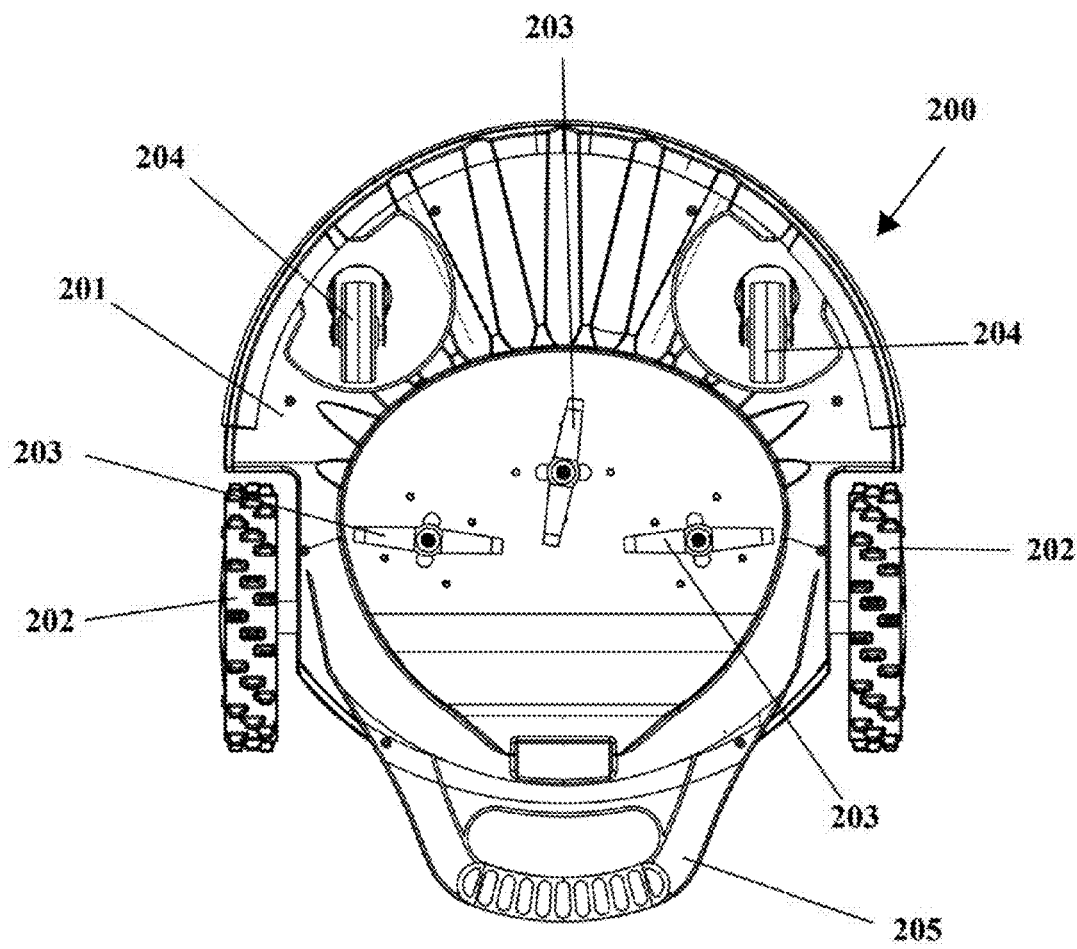
FIG. 3 is a bottom view of the autonomous robot of FIG. 1.
Figure 4:
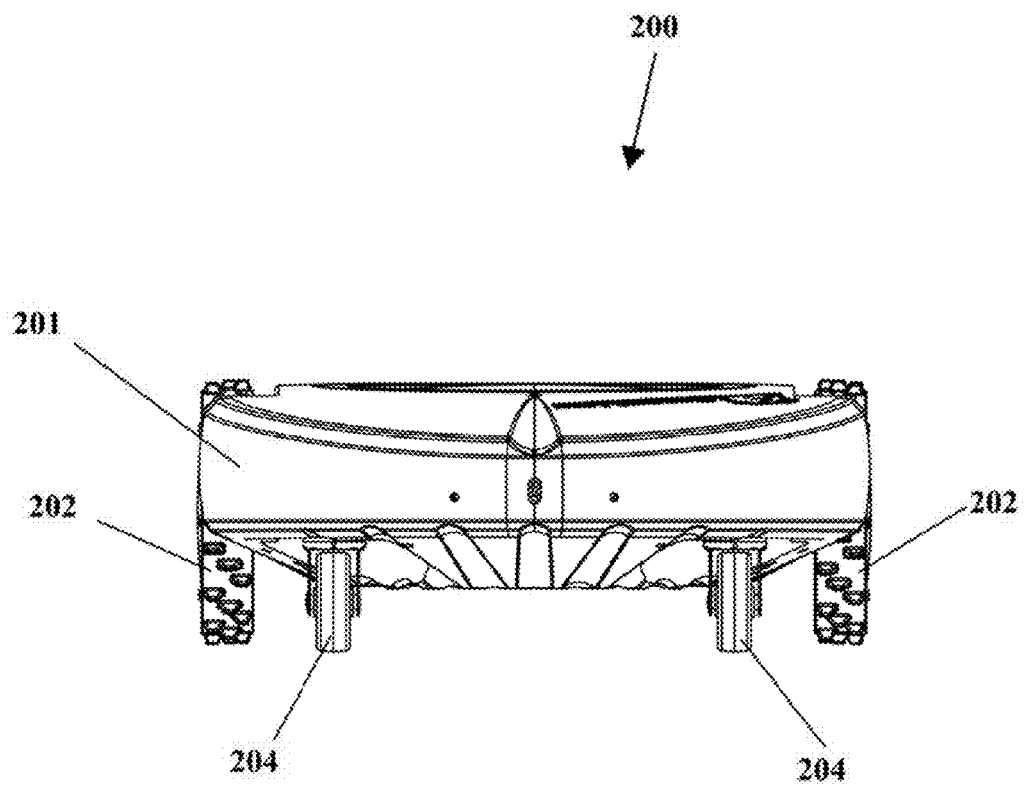
FIG. 4 is a front view of the autonomous robot of FIG. 1.
Figure 5:
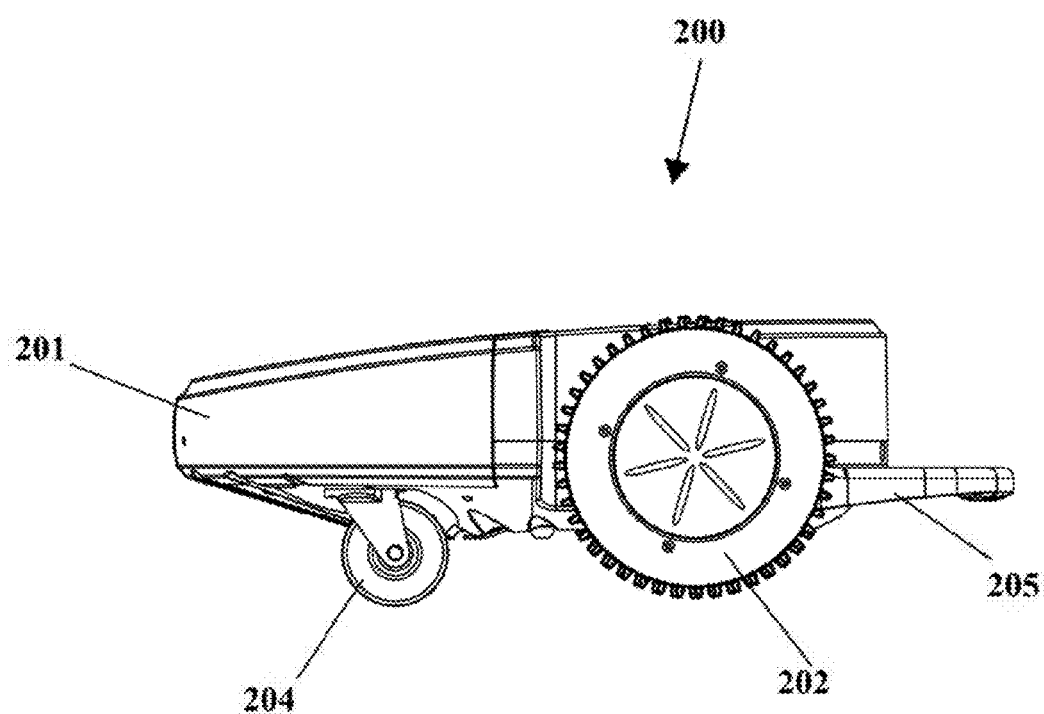
FIG. 5 is a left side view of the autonomous robot of FIG. 1.
Figure 6:
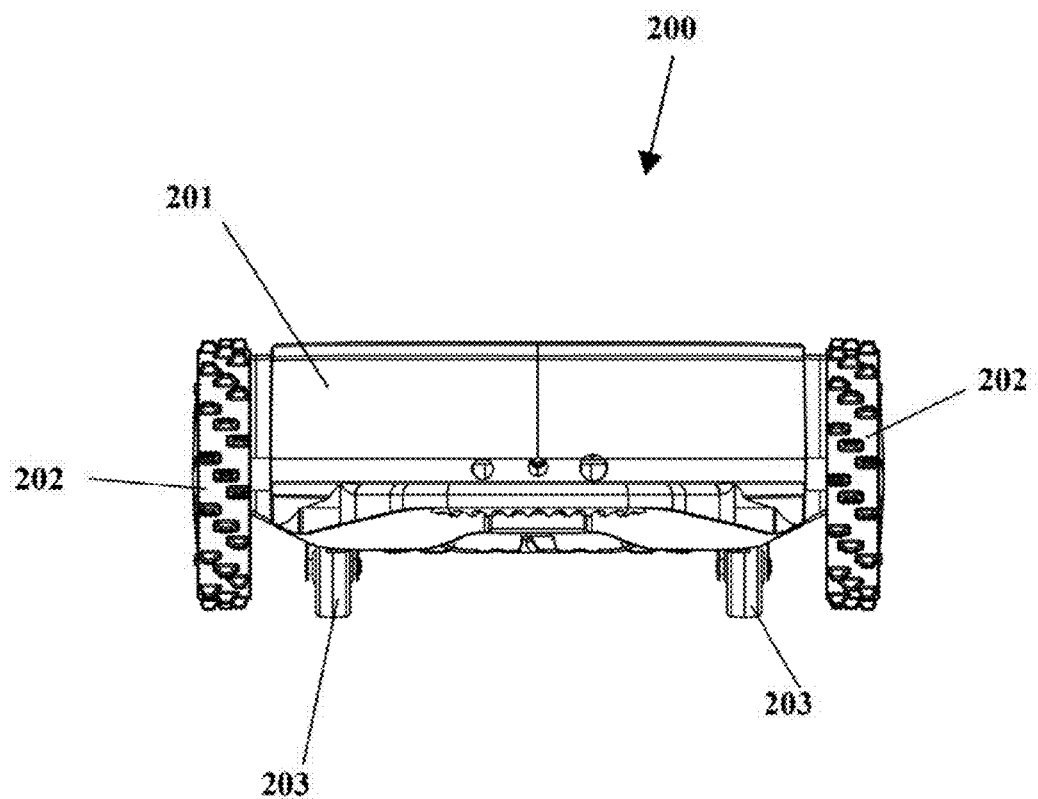
FIG. 6 is a rear view of the autonomous robot of FIG. 1.
Figure 7:
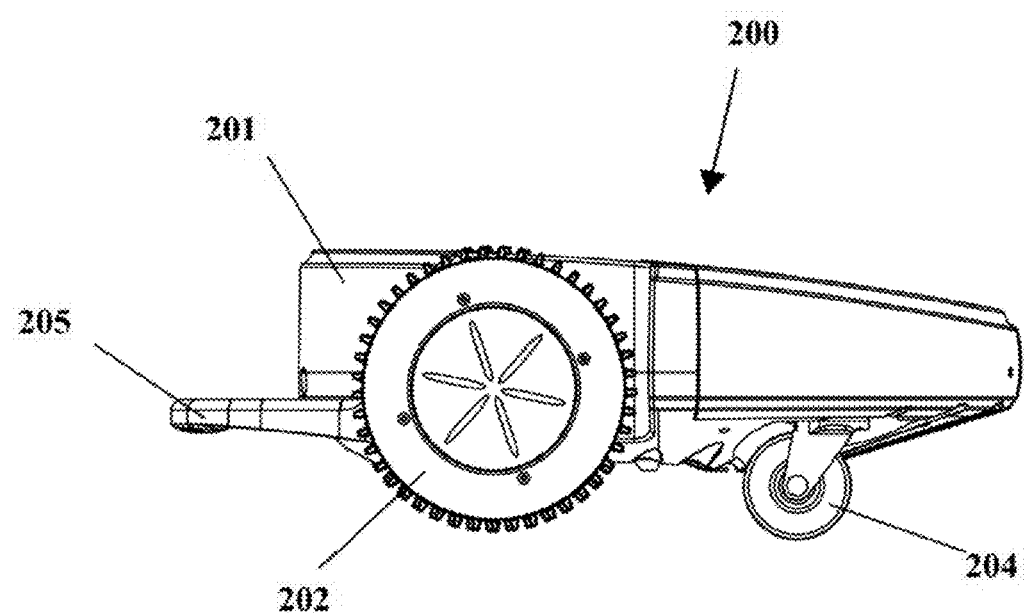
FIG. 7 is a right side view of the autonomous robot of FIG. 1.

Referring first to FIGS. 1-7 concurrently, an autonomous robot 200 designed for mowing a lawn is illustrated according to one embodiment of the present invention. While the invention will be described in terms of an autonomous robot designed for mowing a lawn, it is to be understood that the control system and methods described herein can be implemented into any type of autonomous machine that must perform a desired activity within a desired area of confinement, including without limitation cleaning machines, polishing machines, repair machines, and/or demolition machines.

The autonomous robot 200 generally comprises a main housing 201, a pair of drive wheels 202, grass cutting blades 203 and steering wheels 204. A handle 205 is provided on the rear end of the housing 201 for convenience of handling and/or user-initiated movement. Three cutting blades 203 are provided. However, more or less blades 203 can be implemented.

Figure 13:
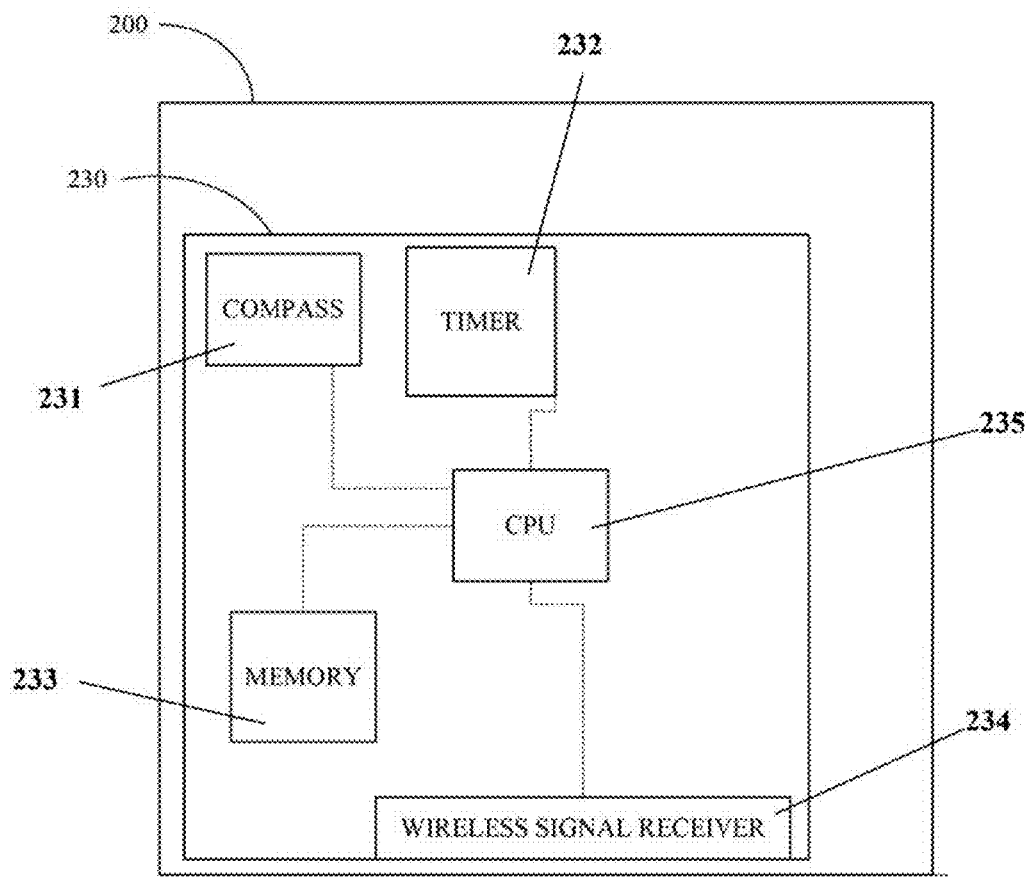
FIG. 13 is a high-level schematic of the control system of the autonomous robot of FIG. 1 according to an embodiment of the present invention.

Referring briefly to FIG. 13, the housing 201 contains all of the internal circuitry and mechanical systems necessary to operate the autonomous robot 200. Specifically, the housing 201 contains a robot control system 230 that contains all of the required internal circuitry. The robot control system 230 includes a compass 231, a timer 232, an internal memory 233 and a wireless signal receiver 234, all of which are operably connected to a CPU 235. The importance of the components of the robot control system 230 will become apparent from the description below. Preferably, the wireless signal receiver 234 is a sensor or other data receiving port for receiving signals from an external control unit. The sensor can be an IR, RF, Wi-Fi or other sensor for receiving wired or wireless data signals. The external control unit is preferably a remote control, a PC, a PDA or a Smart Phone.

It should again be noted that the particular shape, basic features and structural details of the autonomous robot 200 are not to be considered limiting of the present invention, which is directed to the integrated control, mapping and operating systems and methods.

Figure 8:
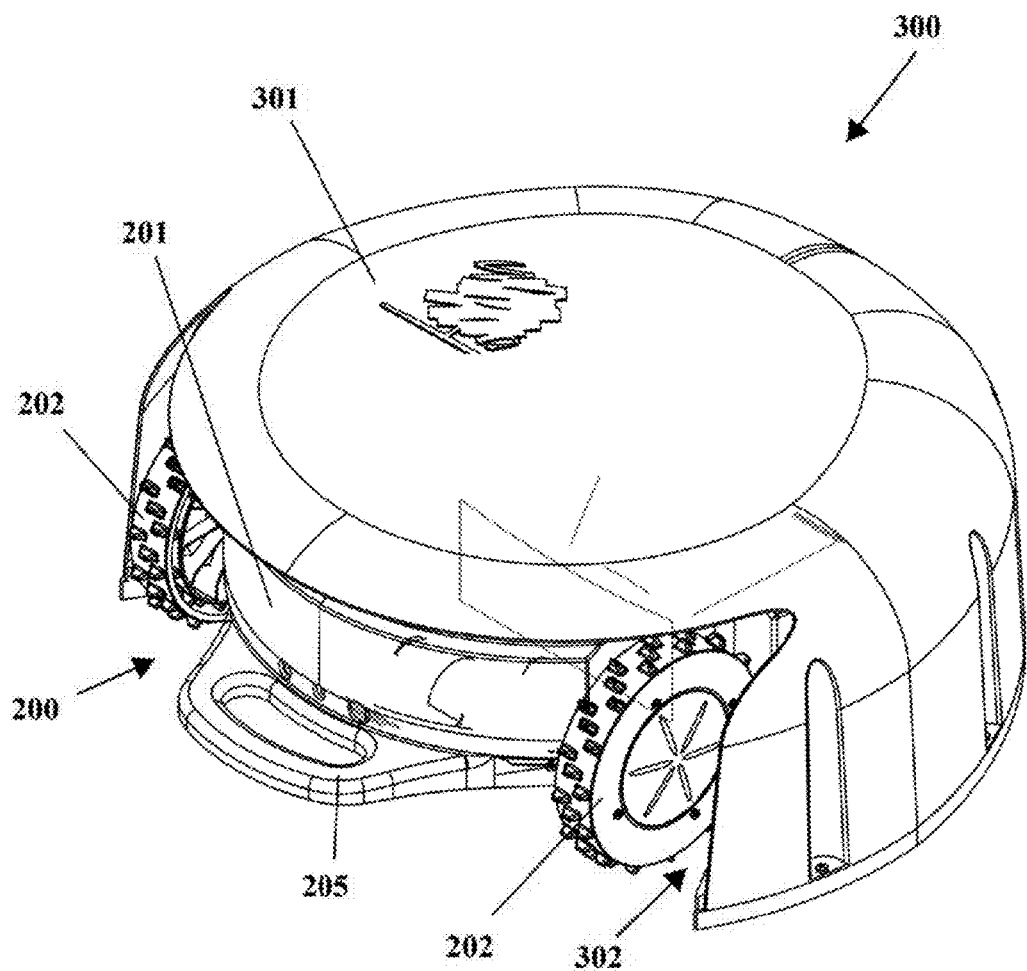
FIG. 8 is a top perspective view of a docking station according to one embodiment of the present invention with the autonomous robot of FIG. 1 positioned therein.
Figure 9:
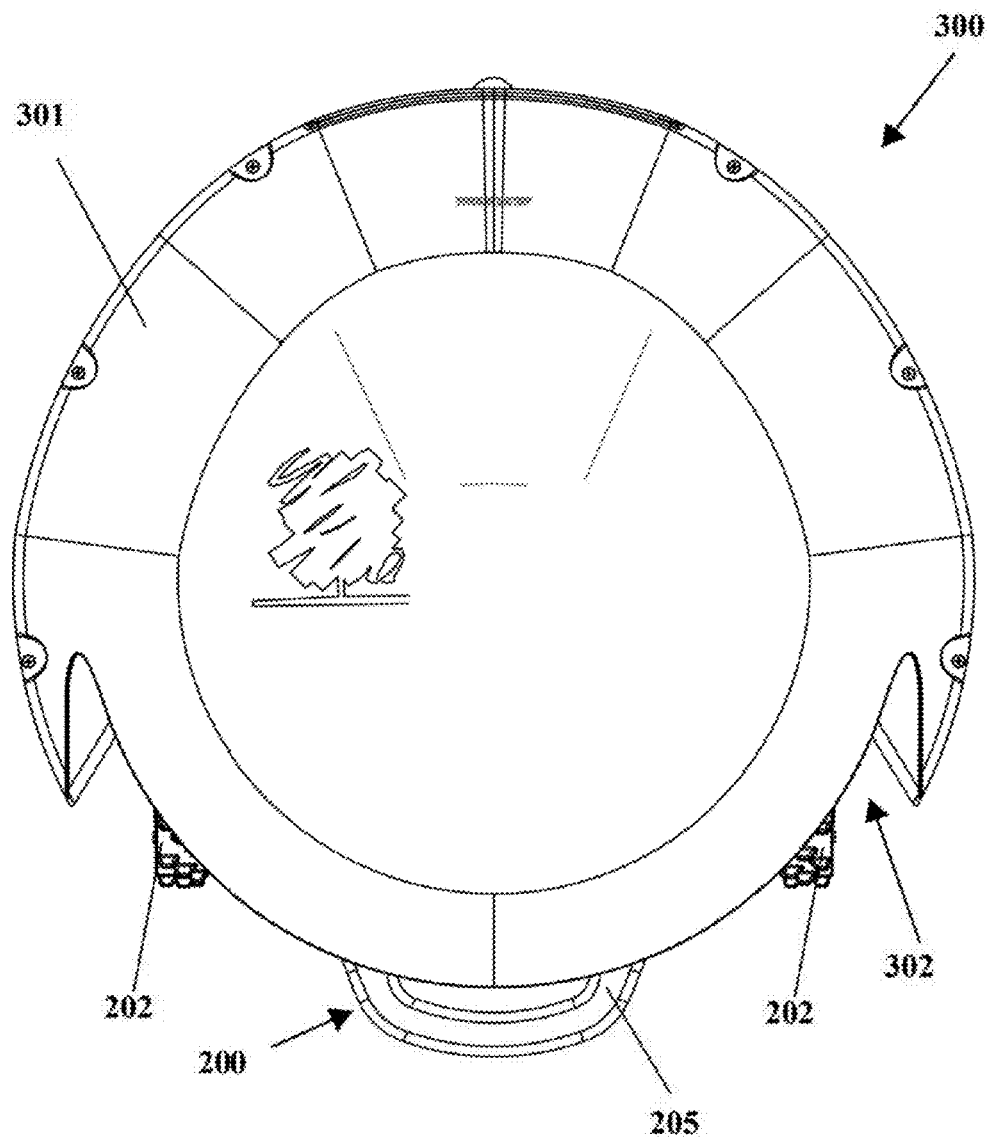
FIG. 9 is a top view of the docking station of FIG. 8.

Referring now to FIGS. 8-9 concurrently, a docking station 300 designed for use with the autonomous robot 200 is illustrated. The docking station 300 provides a housing 301 for receiving the autonomous robot 200. An opening 302 is provided in the housing 301 through which the autonomous robot 200 can pass into the housing 301 for shelter and/or storage during periods of non-use. As can be seen in FIGS. 8-9, the autonomous robot 200 can be positioned entirely within the housing 301 in a manner so that the handle 205 of the autonomous robot 200 can easily be grasped by a user so that a user can remove the autonomous robot 200 from the docking station 300 as needed. Alternatively, the autonomous robot 200 may be removed by way of the remote control or may remove itself automatically upon being turned on and activated for a mowing session.

If desired, the docking station 300 can incorporate a battery charging station for charging the internal batteries of the autonomous robot 200. In one preferred embodiment, the docking station 300 may connect to a PC, PDA, or Smart Phone via Wi-Fi communication in order to present a user with information including, without limitation, a map of a bounded area. In one embodiment, the docking station 300 may connect to the above mentioned autonomous robot 200 via RF. In a preferred embodiment, the docking station 300 is a communication gateway between a remote control, PC, PDA, or Smart Phone and the autonomous robot 200. The docking station 300 may also broadcast a signal that aids the autonomous robot 200 in navigation.

Figure 10:
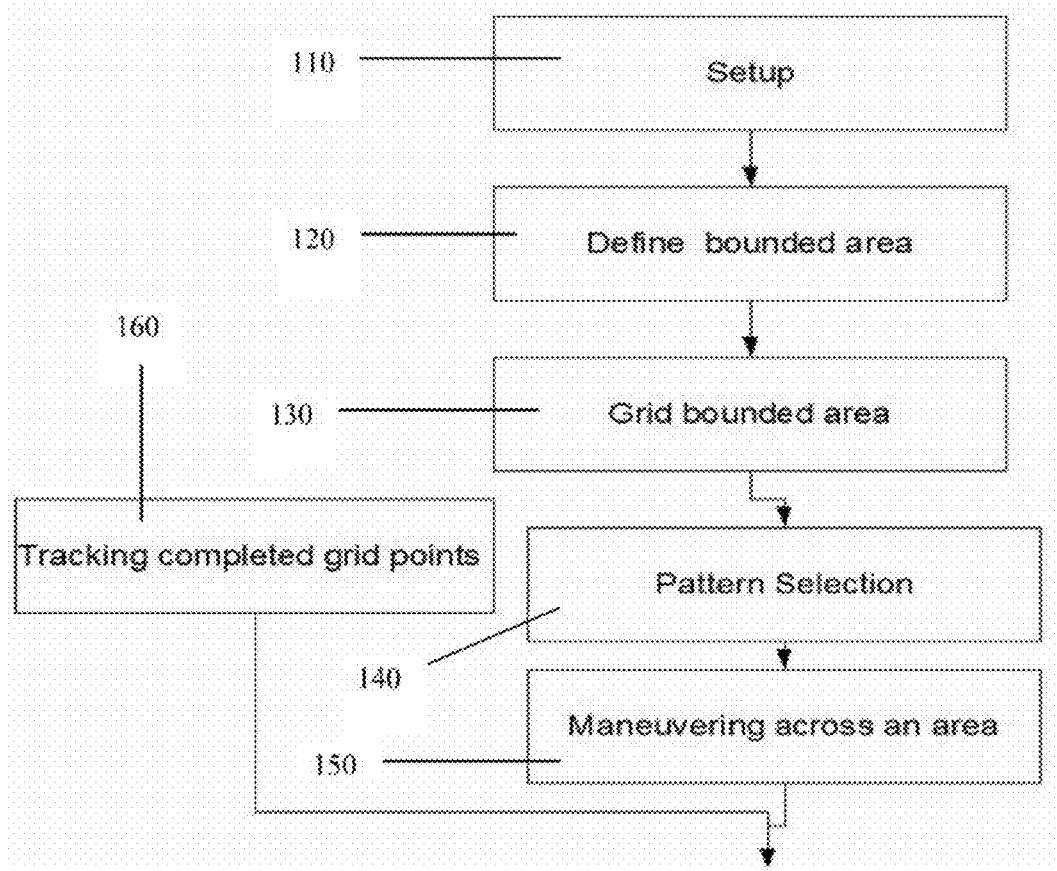
FIG. 10 is a flowchart of the steps that may be used to operate the autonomous robot of FIG. 1 according to one embodiment of the present invention.

Referring now to FIG. 10, a control schematic for the various modes for controlling the movement and operation of the autonomous robot 200 is illustrated. The various modes of the autonomous robot 200 dictate the processes and calculations involved in preparing the autonomous robot 200 for use as well as for actually using the autonomous robot 200. The various modes of the autonomous robot 200 include a Setup/Perimeter Mapping Mode, an Exclusion Area Mode, a Pattern Selection Mode and an Operational Mode. Of course, the invention is not limited to having the four modes mentioned above and it may contain more or less than the four named modes as appropriate for its intended purpose. Each of the named modes will be discussed below with reference to FIGS. 10-12 below.

The autonomous robot 200 has an integrated control system 230 (FIG. 13) that maps and stores a perimeter of the desired area of confinement 220 by relating its current position to an established starting point of the autonomous robot 200 as will be discussed below. When in use, the autonomous robot 200 is able to stay within the defined perimeter of the desired area of confinement 220 by monitoring and mapping its own location with respect to the stored perimeter at all times. The docking station 300 discussed above may act as the starting/zero point for mapping the perimeter and/or resetting the present location of the autonomous robot 200.

The first sequence in preparing the autonomous robot 200 for use in a new environment is for the user to go through the Setup Mode 110, which as discussed in detail below, results in the definition of the bounded area (step 120). The Setup Mode 120 is initiated by switching the autonomous robot 200 to the setup mode by manipulating a mechanical switch or an internal electrical signal switch that activates the CPU 235 within the robot control system 230 of the autonomous robot 200 to retrieve the setup commands and program sequencing which are stored in an internal memory device 233.

The operational sequences of the Setup Mode will be described in greater detail with reference to FIGS. 10-12 concurrently. The Setup Mode is used to define the area of confinement 220 (also referred to herein as the operational perimeter) within which the autonomous robot 200 will perform its task (e.g., lawn mowing, floor cleaning, etc.). Prior to activating the Setup Mode, the autonomous robot 200 is positioned at a point $P_0$ along the desired perimeter 220 and oriented facing the desired direction of travel. In a preferable embodiment (see FIG. 12), this point coincides with the location of the docking station 300.

Once in the desired position, a record starting point ("RSP") signal is sent to the robot control system 230 via the hand-held remote control or a Wi-Fi interface device (or by the activation of a button on the autonomous robot 200) indicating that the autonomous robot 200 is in the desired starting position/location. This RSP signal is generated by activating the proper control on the interface of the remote control or Wi-Fi interface device or can be automatically generated upon switching into Setup Mode. As a result of receiving this RSP signal, the robot control system 230 records this location as the starting point $P_0$ in its internal memory 233 (which acts as the internal point of reference).

Figure 12:
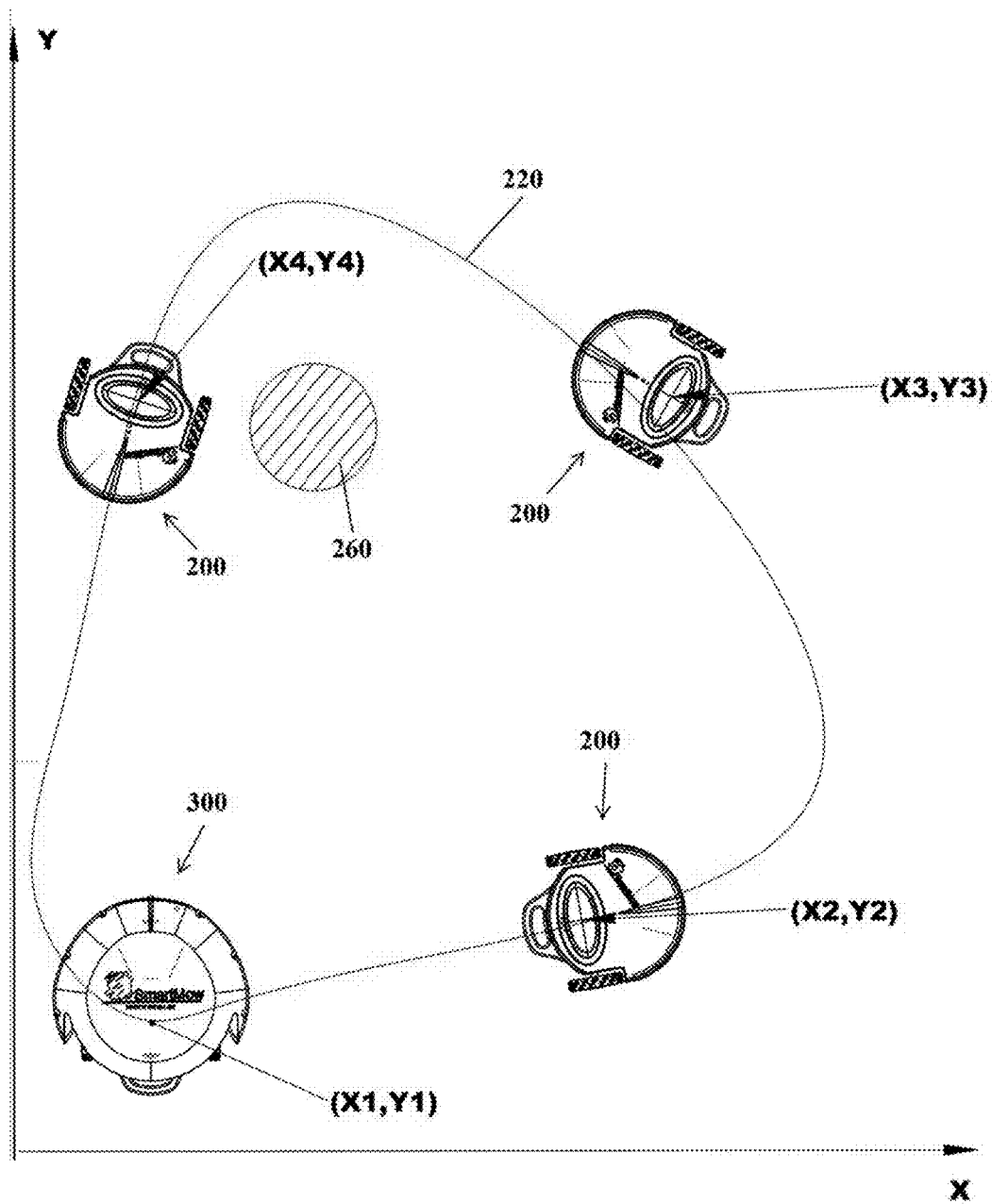
FIG. 12 is a schematic of the autonomous robot performing a coordinate mapping function to define the desired area of confinement within which the autonomous robot will perform its task.

Referring solely to FIG. 12, the starting point $P_0$ may be recorded by the robot control system 230 as a coordinate in an XY or $X\theta$ coordinate system. For example, starting point $P_0$ may be recorded by the robot control system 230 as the Cartesian coordinate (0, 0) which will then become the relative reference point upon which all subsequent locations are based. As shown in FIG. 12, as the autonomous robot 200 maneuvers across the perimeter 220, the robot control system 230 will continuously record its location as a coordinate in an XY plane. Although FIG. 12 illustrates the robot control system 230 recording four coordinates around the perimeter, the robot control system 230 is actually constantly recording the coordinates to the internal memory 233 so that the perimeter 220 can be mapped on an XY plane.

Referring again to FIGS. 10-12 concurrently, it should be noted that while the starting point $P_0$ is preferably a position located on the perimeter 220 for simplicity and ease of computing, it is possible for the starting point $P_0$ to be offset from the perimeter 220. In such a scenario, the CPU 235 of the robot control system 230 can be programmed to detect that the starting point $P_0$ was not a point on the perimeter 220 upon detecting that a closed-geometry has been formed (discussed below) that does not include the starting point $P_0$. Additionally, while the autonomous robot 200 is preferably positioned at the starting point $P_0$ prior to activating the Setup Mode, the autonomous robot 200 can be in a different position and moved to the desired starting point $P_0$ subsequent to the initiation of the Setup Mode. In this scenario, the RSP signal will be generated by the user as desired, but preferably when the autonomous robot 200 is along the perimeter 220.

It should be noted that the closed-geometry may be any shape that forms an enclosed boundary, such as a polygon. Of course, the closed-geometry can be shapes other than polygons, such as circles, ovals or other enclosed shapes with curved sides, linear sides, rounded sides, and/or combinations thereof.

Furthermore, in order to ensure proper coverage and geographic containment of the autonomous robot 200 in the event that the autonomous robot 200 must be reset (explained in greater detail below), it may be preferable that the position of the docking station 300 coincide with the location of the starting point $P_0$ (FIG. 12).

Once the starting point $P_0$ is established (i.e., recorded and mapped in the memory 233), the user activates movement of the autonomous robot 200 in a desired direction about the perimeter 220. The user directs the autonomous robot 200 around the perimeter 220 with a remote control or Wi-Fi interface which enables the user to move and steer the autonomous robot 200 in a desired direction. As the autonomous robot 200 moves along the perimeter 220, the autonomous robot 200 tracks and records its own location (and direction of movement) internally via the robot control system 230.

The autonomous robot 200 preferably tracks and records its location with the use of the compass 231 and the timer 232. The compass 231, which is located within the autonomous robot 200 and is operably coupled to a CPU 235, provides a direction/bearing for the movement of the autonomous robot 200 at all times. Of course, the autonomous robot 200 need not have the compass 231 and other directional indicating instruments as would be known to persons skilled in the art may be used in lieu of the compass 231.

The timing of the movement of the autonomous robot 200 along the established bearing/direction is measured by the timer 232, which is also operably coupled to the CPU 235. Of course, the autonomous robot 200 does not need to have the timer 232 and other sensors or mechanisms for monitoring electrical signal characteristics may be used instead of the timer 232. In the preferred embodiment, the timer 232 acts as a distance-traveled measuring mechanism.

The timer 232 is an effective distance-traveled measuring mechanism. For example, if the autonomous robot 200 is programmed and designed to ensure travel at a constant velocity, the timer 232 can record the time traveled in any one direction (as measured by the compass 231) based on the relationship: $D=V*t$, wherein D is distance traveled, V is velocity and t is time elapsed. If the direction of travel is changed, the traveled vector can be recorded and the mapping of the subsequent vector will begin until a closed-geometry is formed.

Figure 11:
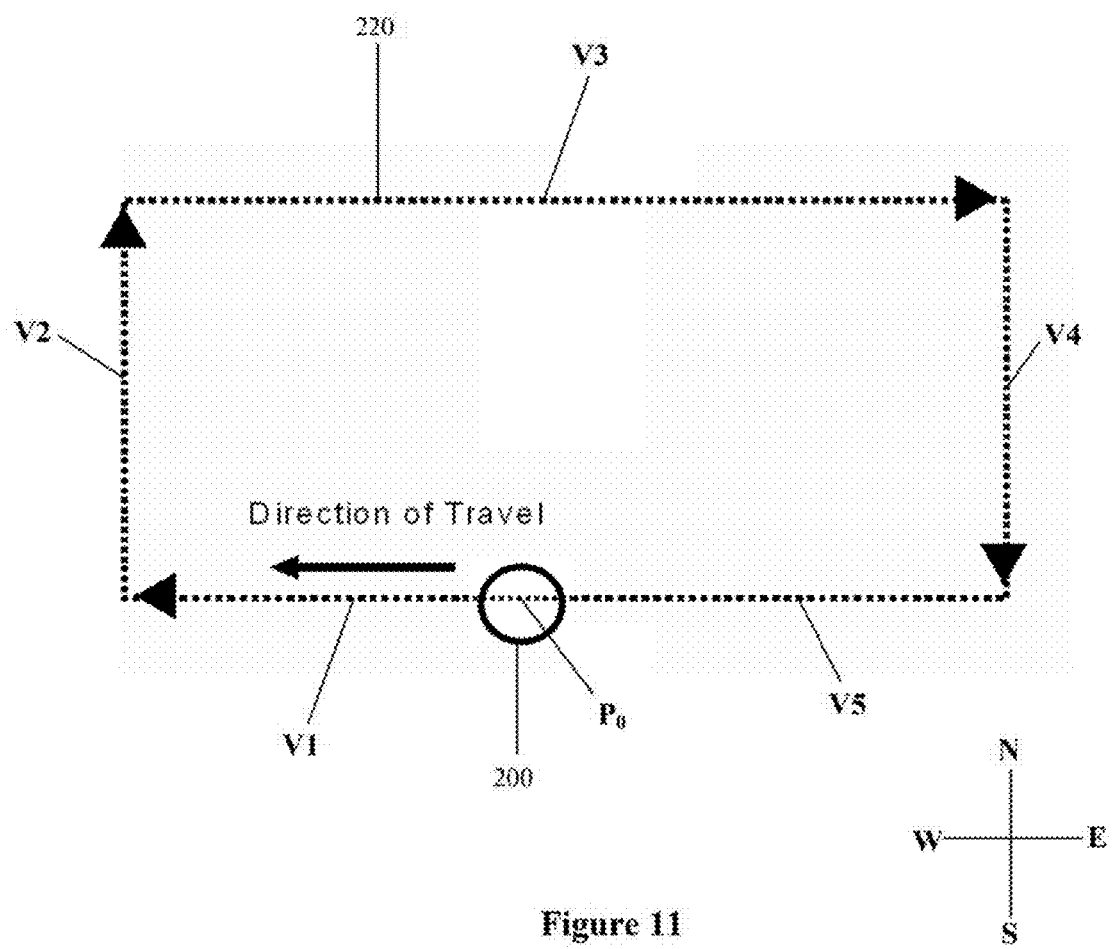
FIG. 11 is a schematic of the autonomous robot performing a perimeter mapping function to defines the desired area of confinement within which the autonomous robot will perform its task.

In the preferred embodiment illustrated in FIG. 11, because the autonomous robot 200 is designed to move at a constant velocity (the value of which is stored in the CPU 235), the CPU 235 will be able to calculate the distance and direction which the autonomous robot 200 has traveled during this first period of movement based on the signals from the timer 232 and the compass 231. In other words, the CPU 235 will calculate and map the current location of the autonomous robot 200 with respect to the starting point $P_0$ and record the appropriate data in the memory 233. In the illustrated example, the first period of movement results in the CPU 235 mapping a first vector V1 having a distance value and an angle. The mapping/recording of any single vector or positional update by the CPU 235 can be continuous, periodical or initiated by a substantial change in direction/bearing of the autonomous robot 200.

Once V1 is mapped, the user continues moving and steering the autonomous robot 200 about the desired perimeter 220, thereby resulting in the CPU mapping and recording the remaining vectors V2-V5 based on the information provided by the timer and the compass. Of course, a Cartesian coordinate mapping scheme, as discussed above with reference to FIG. 12, can be used by the CPU 235 to the same effect.

As should be apparent to those skilled in the art, through the combined use of a directional indicating instrument (compass 231) and a distance-traveled measuring mechanism (timer 232), the autonomous robot 200 can, at all times, be aware of its location with respect to the starting point $P_0$. While the directional indicating instrument is preferably a compass, other devices can be used. Moreover, while the distance-traveled measuring mechanism is exemplified as a timer 232 and constant velocity drive, a variety of sensors, mechanisms for monitoring electrical signal characteristics and/or timers can be used to determine the distance traveled by the autonomous robot 200. For example, a sensor can be operably connected to the axle or wheel to record revolutions, which through simple mathematical relationships, can be correlated to the distance traveled so long as the radii of the drive wheels 202 are known. Moreover, it should be noted that it is not necessary for the autonomous robot 200 to move at a constant velocity in order to map the vectors, so long as the CPU constant velocity is aware of the velocity at substantially all moments, and the time durations thereof. Of course, averaging and differentiation techniques can also be used.

Any of the aforementioned computations of distance can take into account changes and/or variations in velocity, acceleration, bearing and/or combinations thereof experienced by the autonomous robot 200 in real world conditions. Other variables, such as wheel slippage, obstruction, and/or delay, can also be taken into consideration in computing the distance. In one preferable embodiment, wheel slippage, obstruction, and/or delay can be measured by monitoring the current usage of the drive motors. All of the information relating to the variables can be stored in the internal memory 233 and retrieved by the CPU 235 on an as-needed basis.

In one preferable embodiment, the compass and distance measurements can be replaced or supplemented with other apparatus used in precise navigation that can be adapted to the use of the autonomous robot 200. A first example includes the detection of signals from a plurality of satellites in orbit around the planet Earth, such as Global Positioning System (GPS), Global Navigation Satellite System (GLONASS), Galileo or similar satellite signals that broadcast time or navigational measurements using a receiver.

Alternatively, the compass and distance measurements can be replaced or supplemented with other apparatus used in triangulation that can be adapted to the use of the autonomous robot 200. A first example includes the detection of signals from a plurality of radio beacons that broadcast navigational data placed around the perimeter of the area of interest. The compass and distance measurements may be processed on a host computer connected to the autonomous robot 200 over a wireless connection to the Internet.

In another preferred embodiment two sources of navigational measurements are used to improve navigational accuracy. A first example includes differential correction of navigational measurements where one source of navigational measurements transmits corrected information to the second source of navigational measurements using radio signals, such as in the art and practice of differential GPS (DGPS).

With that said, once the autonomous robot 200 finishes travel along vector V5 ending up back at the starting point $P_0$, the CPU 235 either automatically recognizes that a closed-geometry has been formed (through proper programming) or the user activates a compute closed perimeter ("CCP") signal that is received by the CPU 235 by activating the proper button on the interface of the remote control, PC, PDA, or Smart Phone. Using the docking station 300 at the desired starting point $P_0$ provides a reliable way of ensuring that the autonomous robot 200 ends back at the starting point $P_0$ after its journey about the desired perimeter 220.

Once the creation of a closed-geometry is recognized, the user will be prompted to confirm that the desired perimeter 220 has been established. In one embodiment, the remote control may have a display which displays the map created by the CPU 235. In another embodiment, the autonomous robot 200 may connect to a PC, PDA, or Smart Phone via Wi-Fi which displays the map created by the CPU 235. This allows the user to get a general idea of whether the perimeter mapping sequence was a success. After the closed-geometry is recognized and/or approved, the CPU 235 will record the mapped perimeter 220 and use it as the limitations of its area of confinement during a work session. In a preferred embodiment, autonomous robot 200 serves as a lawn mower and the defined bounded area 220 surrounds a yard.

In one preferred embodiment, the user may program the autonomous robot 200 with multiple perimeters in which the autonomous robot 200 will travel to each perimeter and use it as the limitations of its area of confinement during a work session. This allows the autonomous robot 200 to travel between different parts of a lawn, for example, front and back yards.

Referring back to FIG. 10, after the robot control system 230 defines the bounded area through either a vector or coordinate mapping scheme, step 120 is complete. The robot control system 230 then translates the area within the perimeter 220 to a grid and grids the bounded area, thereby completing step 130.

Once this is done, the next step is for the user to select a pattern that will define the behavior of the autonomous robot 200 while traveling inside the defined perimeter 220 while performing its task. Possible patterns include random, semi-random, or specific patterns whereby the autonomous robot 200 may travel in stripes, circles, squares, or any other pre-specified pattern. In one embodiment, the CPU 235 may calculate a number of possible patterns based on the application of preprogrammed algorithms to that particular defined perimeter 220. In another embodiment, the pattern may be transmitted to the autonomous robot 200 via a PC, PDA, or Smart Phone. Once the pattern has been determined, step 140 is complete.

Once the pattern has been selected by the user, the autonomous robot 200 is put into operational mode where it begins the step of maneuvering across an area defined by bounded area 220, thereby completing step 150. Robot control system 230 may use the boundary information, robot dimensions (cutting width), and exclusion information to generate a grid or map that indicates where the autonomous robot 200 should travel, should not travel or has already traveled. This includes the step of tracking completed grid points (step 160). With all of this information stored in the internal memory 233 of the robot control system 230, the robot control system 230 navigates the autonomous robot 200 inside the boundary 220 according to the selected pattern.

As noted above, the robot control system 230 can also store exclusion information for use in directing the autonomous robot 200. In order to input exclusion information into the robot control system 230, the user must set the device to the Exclusion Area Mode by activating a manual, internal or electronic switch. In this mode, the user can define exclusion zones, or portions within the defined bounded area 220 that the user does not want the autonomous robot 200 to travel.

In order to create these exclusion points, the user must initially position the autonomous robot 200 at a starting point and initialize the Exclusion Area Mode. Initialization may take place either by sending a signal to the robot control system 230 (via the remote control or other Wi-Fi device) or it may automatically occur by positioning the autonomous robot 200 at a location within the area of confinement and then setting the autonomous robot 200 to the Exclusion Area Mode. Next, through use of the remote control or other Wi-Fi device, the user must move/drive the autonomous robot 200 around the area of exclusion (i.e. around a tree, around a deck, or around a garden, illustrated generically as a circle 260 in FIG. 12).

The user can define additional exclusion zones by repeating this step at different locations within the defined bounded area until satisfied. When in the exclusion mode, the robot control system 230 performs a mapping function similar to that discussed above with respect to the Setup Mode but instead uses the defined closed-geometry to define an area of exclusion in which the autonomous robot 200 will not be allowed to travel. The robot control system 230 then knows to direct the autonomous robot 200 to steer clear of the exclusionary zones and to focus on performing its task elsewhere (within the perimeter 220).

During the Operational Mode, the robot control system 230 uses the boundary information, the robot dimensions, such as, for example, the cutting width, exclusion area information and selected course pattern information to generate a grid or map and path that indicates where the autonomous robot 200 should travel. Using all of this information, the autonomous robot 200 is able to perform a desired task within a bounded area as desired.

Additionally, the robot control system 230 is able to detect when the autonomous robot 200 has completed its task or has a low battery. The robot control system 230 is constantly aware of the location of the autonomous robot 200 within the defined bounded area 220 by coordinates or other mapping techniques as discussed above. As such, the robot control system 230 is able to prevent the autonomous robot 200 from leaving the defined bounded area and guide the autonomous robot 200 to other bounded areas and back to the point $P_0$. For example, the robot control system 230 may direct the autonomous robot 200 to return to the docking station 300 for docking or recharging and then direct the autonomous robot 200 back to the point $P_0$.

In a preferred embodiment of the present invention, the robot control system 230 uses a Secure Pin to activate the autonomous robot 200. This Secure Pin may serve as a theft deterrent to prevent the unauthorized use or possession of the autonomous robot 200. In order to further prevent theft of the autonomous robot 200, the robot control system 230 may connect to a PC, PDA, or Smart Phone via Wi-Fi. When so connected, robot control system 230 sends registration information such as location (based on IP address), diagnostic information (i.e. state of health), and other information to a server. This information may prove helpful in identifying a stolen autonomous robot 200 and in determining how parts are failing.

The robot control system 230 is also able to detect which portions within the defined bounded area 220 have already been traversed by the autonomous robot 200 during a cutting session. Thus, if the autonomous robot 200 needs to be recharged in the middle of a lawn cutting session, the autonomous robot 200 can continue its job from where it left off once its batteries are recharged.

As stated above, the robot control system 230 knows the exact location of the autonomous robot 200 at all times. Thus, the robot control system 230 is able to keep track of the completed grid points and steer the autonomous robot 200 away from those grid points that it has already performed its task on so that it can complete its task on other grid points within the bounded area 220. Furthermore, the robot control system 230 may also comprise an internal date and time circuit so that the autonomous robot 200 performs its task only at desired times and days.

In the event that the autonomous robot 200 was traveling outside of the defined perimeter 220 or having other "location awareness" difficulties, the control system 230 would also be programmed with a "reset" feature that could be activated automatically by the autonomous robot 200 or user. In such a situation, the user would return the autonomous robot 200 to the point $P_0$ and activate the reset feature. This "reset" would automatically reset the perceived location of the autonomous robot 200 to point $P_0$ without erasing the defined perimeter or exclusion areas.

Alternatively, the autonomous robot 200 may be equipped with an emergency shut-off in order to avoid the potential for harm to a person or object. The emergency shut-off will automatically shut down the autonomous robot 200 if it happens to travel outside of the defined bounded area 220. The user may also desire to shut down the autonomous robot 200 while it is performing its task. This can be done by pressing an off button on the remote control or other Wi-Fi interface.

Finally, the autonomous robot 200 may also include various behaviors for escape to allow the autonomous robot 200 to avoid becoming stuck. For example, the autonomous robot 200 may include foldable legs with wheels on the ends to lift the autonomous robot 200 off of the ground and move it to a location that is better suited for performing its task. This may prove helpful if, for example, the autonomous robot 200 becomes stuck on a tree root and is unable to maneuver itself beyond the tree root while affixed to the ground. Additional escape behaviors as would be known to those skilled in the art have also been contemplated within the scope of the present invention.

Figure 14:
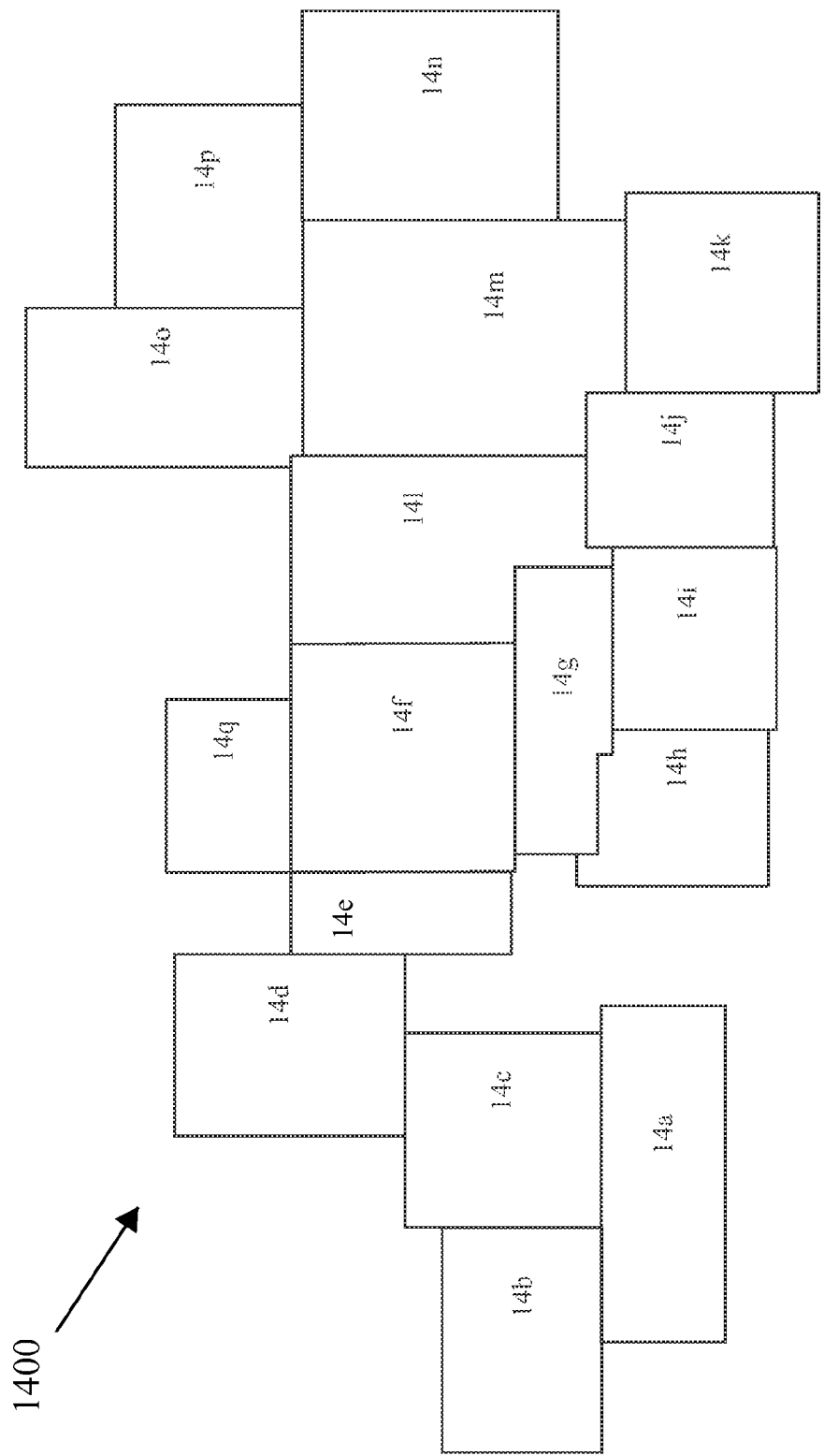
FIG. 14 is an electrical schematic of the control system of the autonomous robot of FIG. 1 according to an embodiment of the present invention.
Figure 14A:
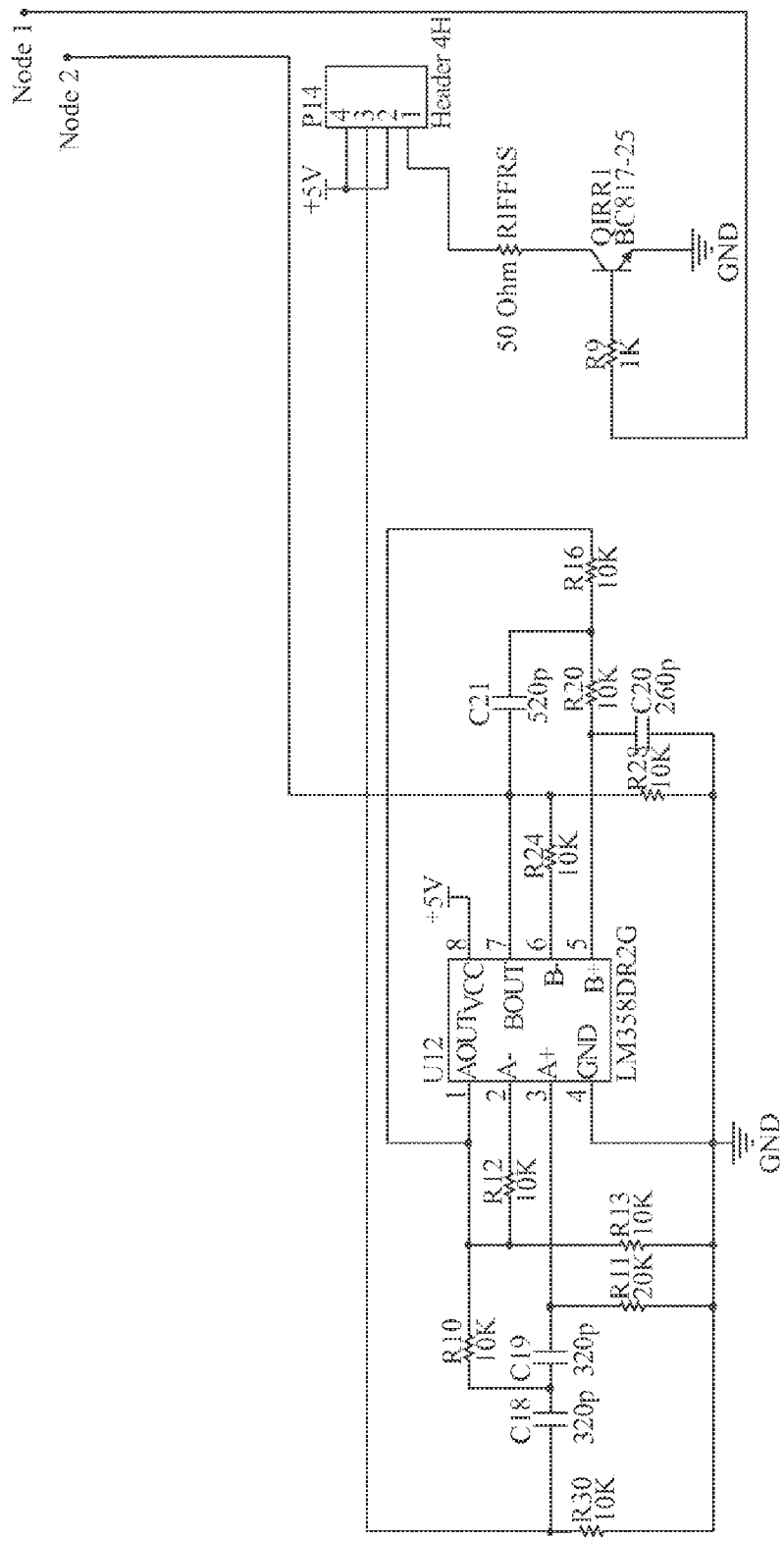
Figure 14B:
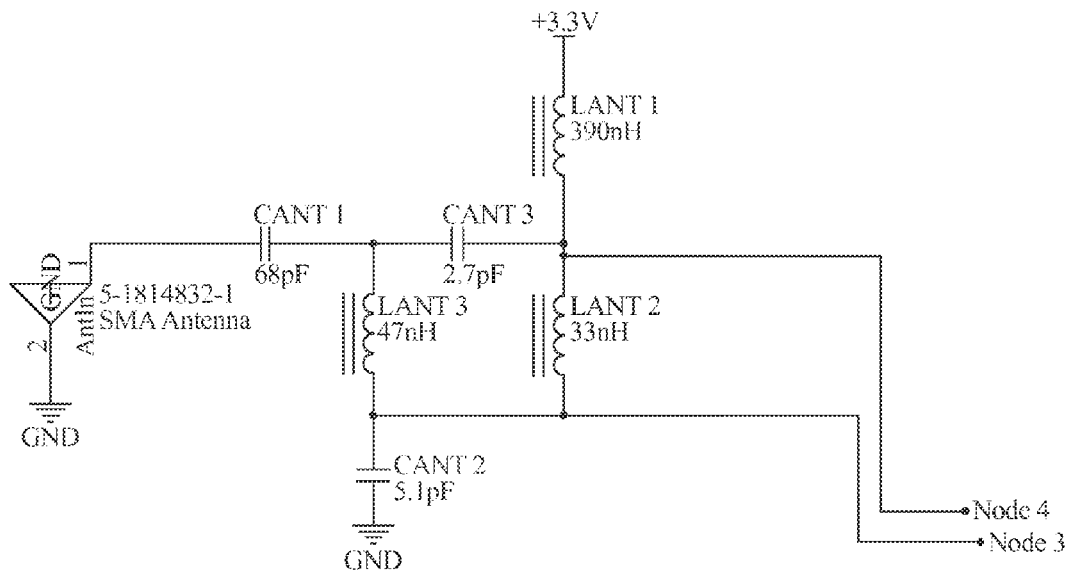
Figure 14C:
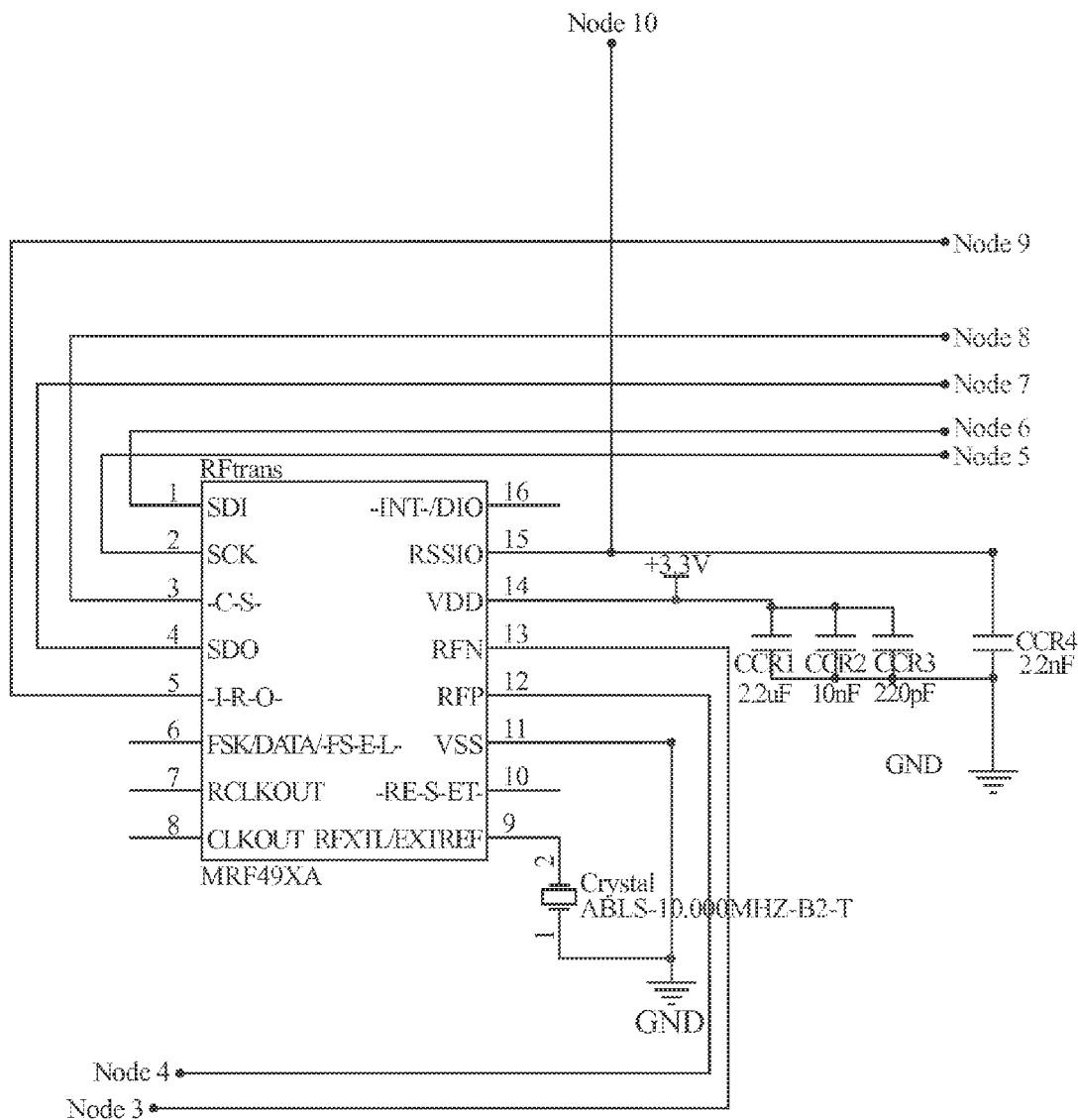
Figure 14D:
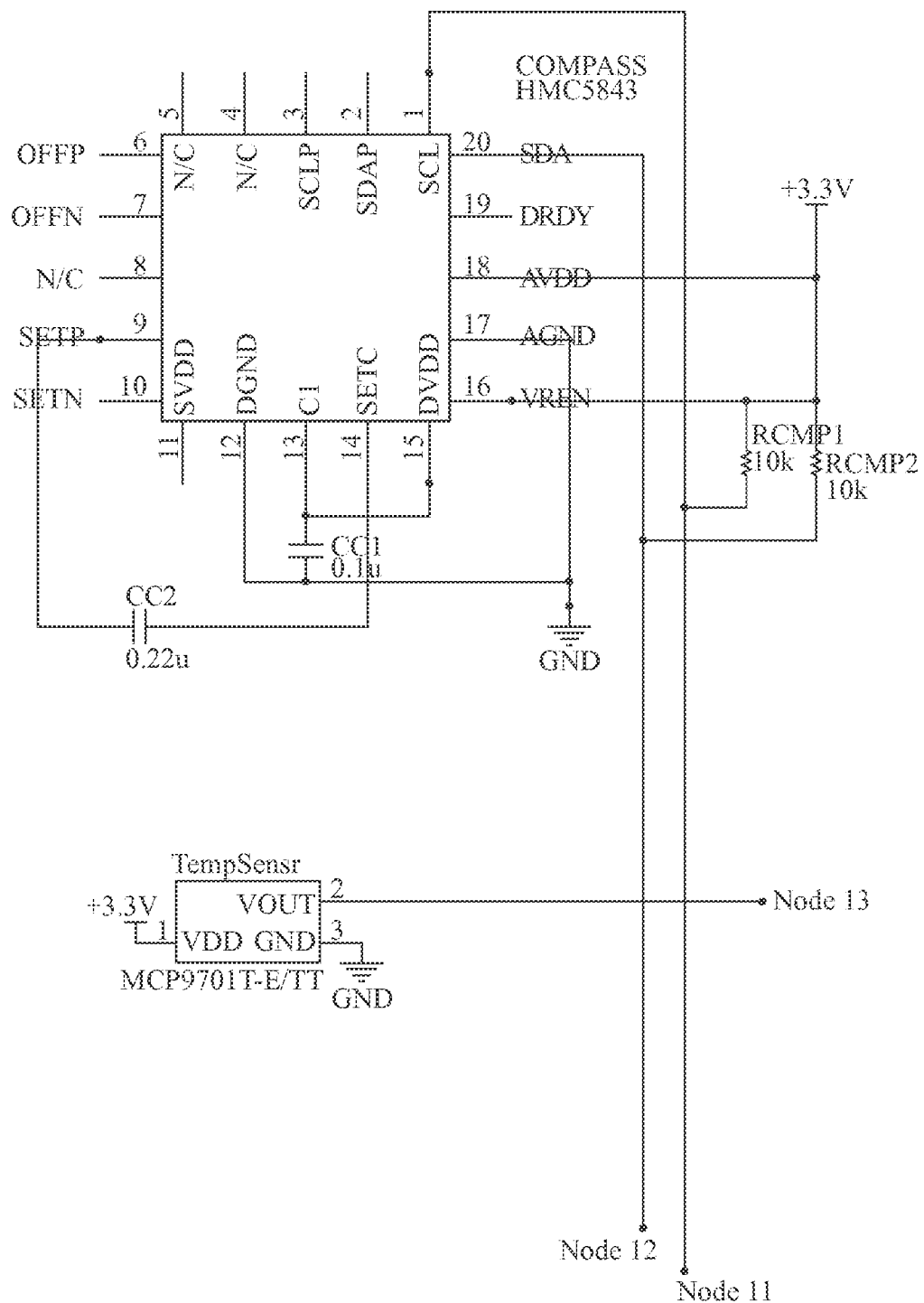
Figure 14E:
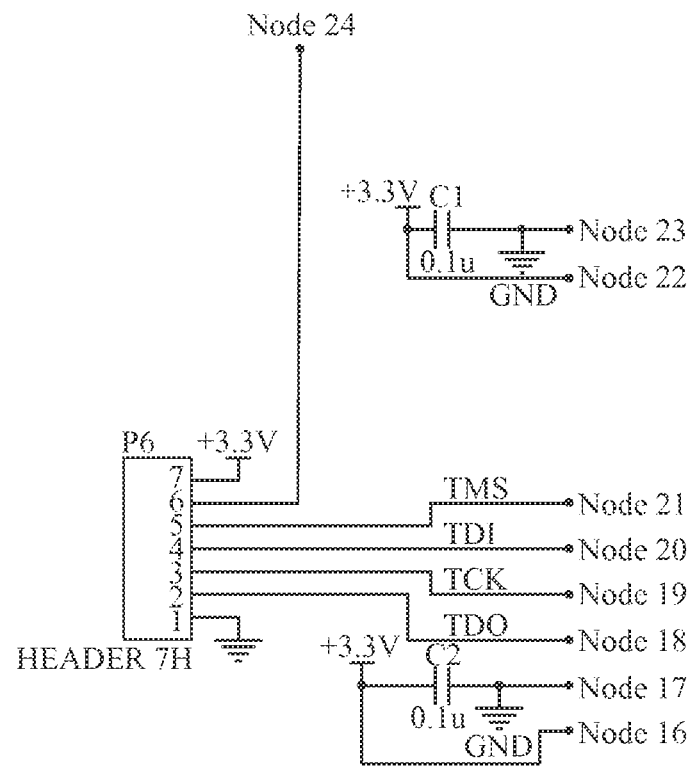
Figure 14E:
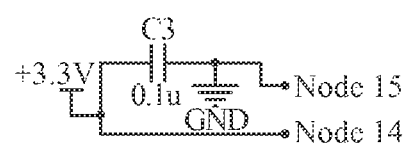
Figure 14F:
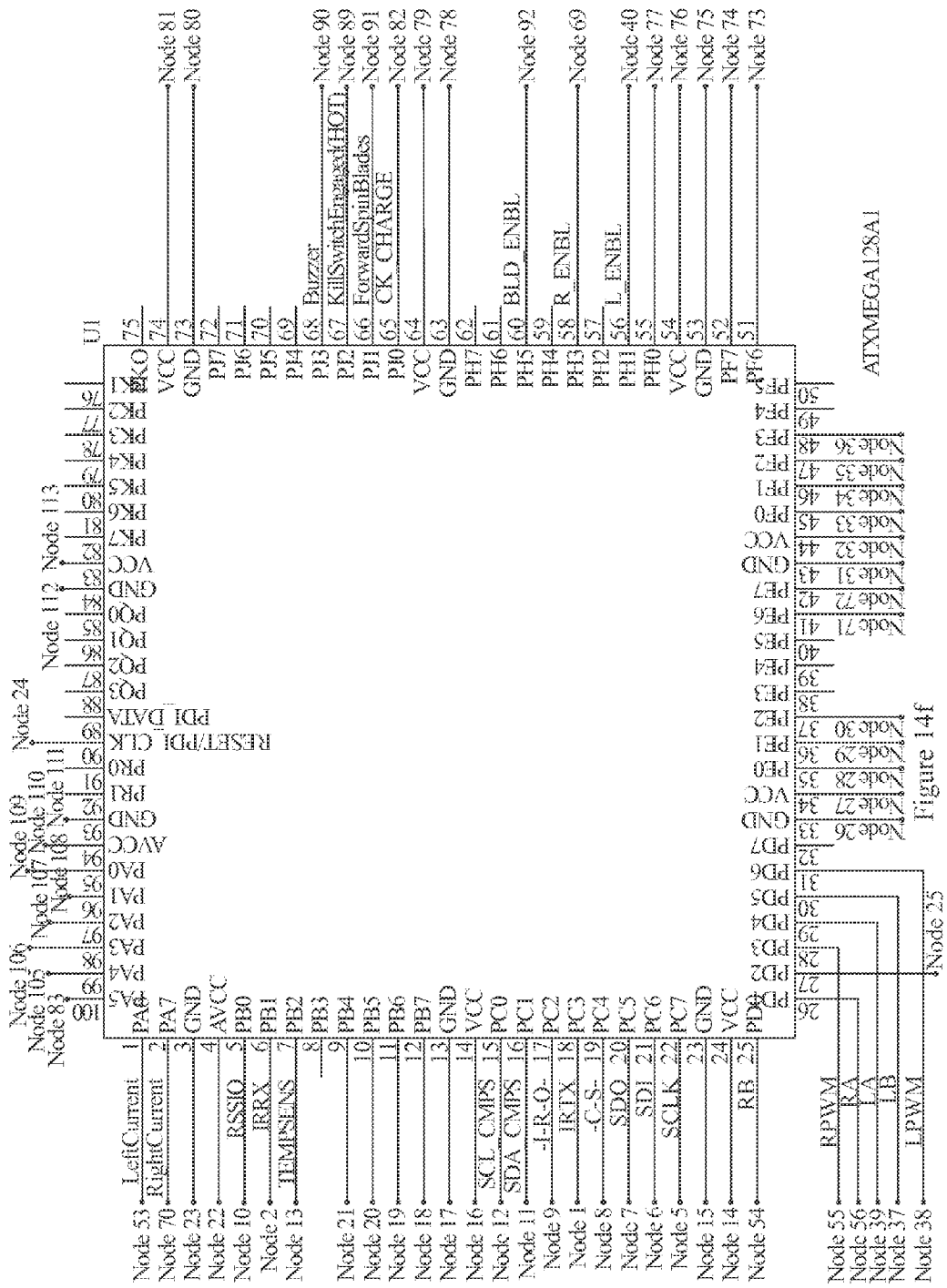
Figure 14G:
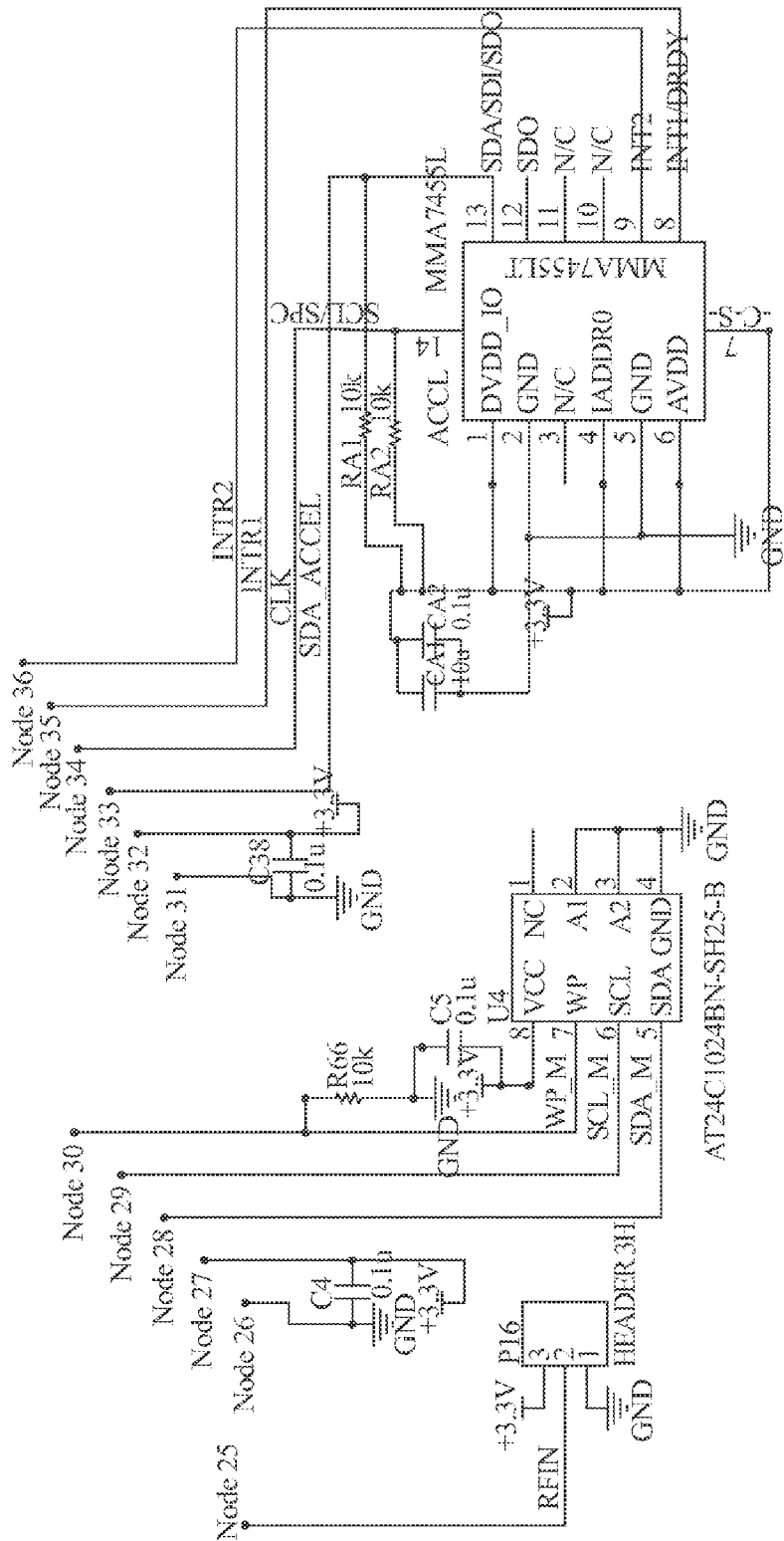
Figure 14H:
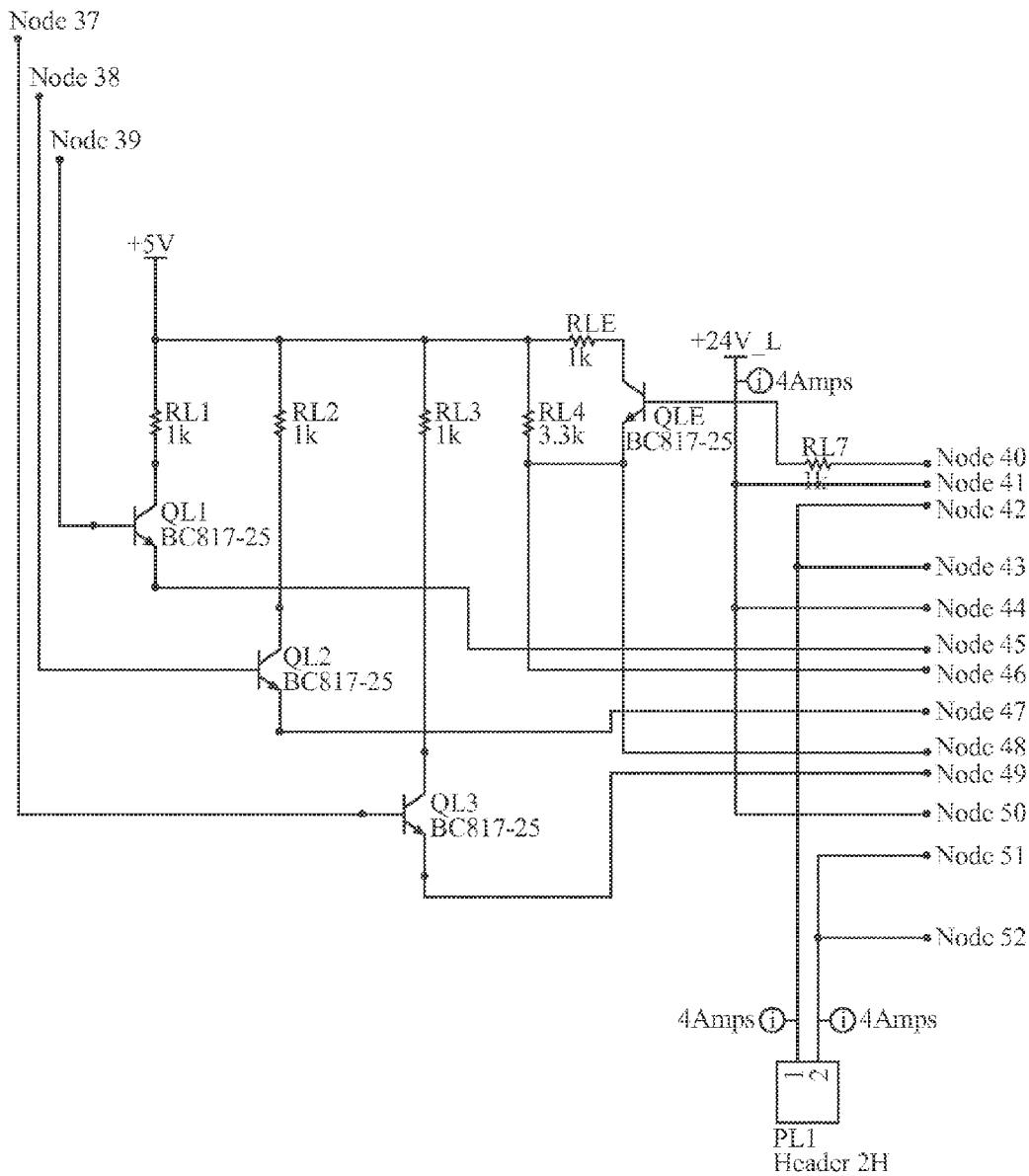
Figure 14I:
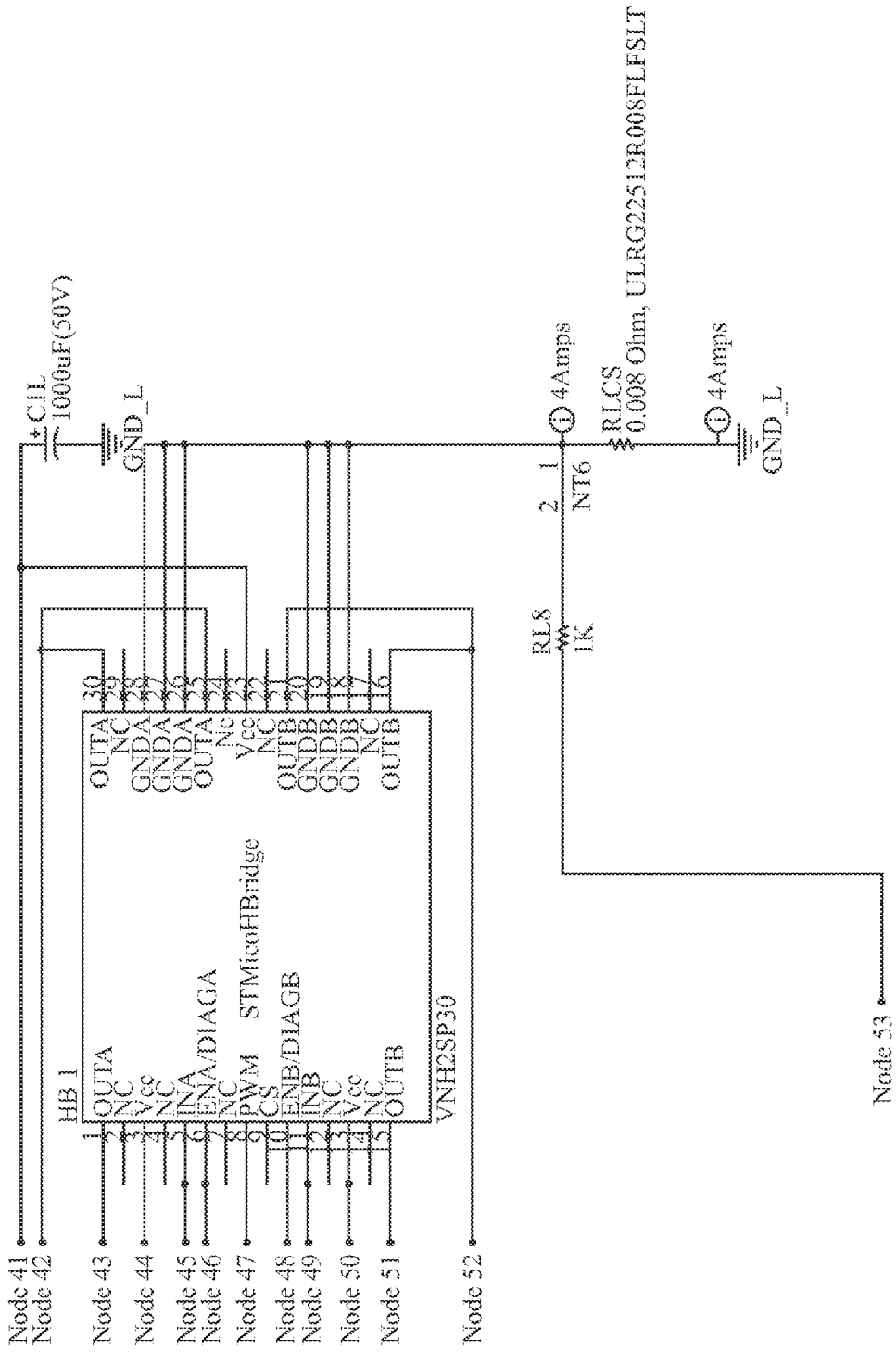
Figure 14J:
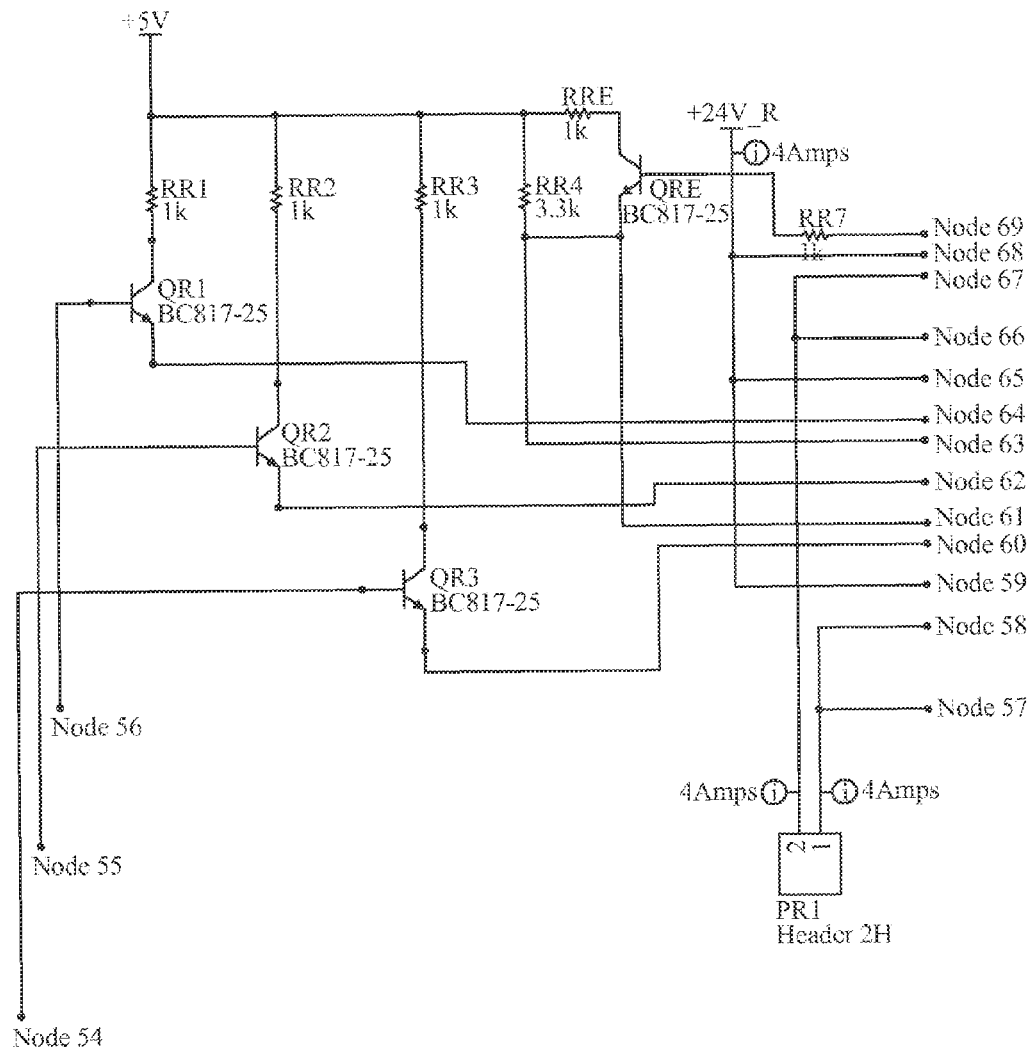
Figure 14K:
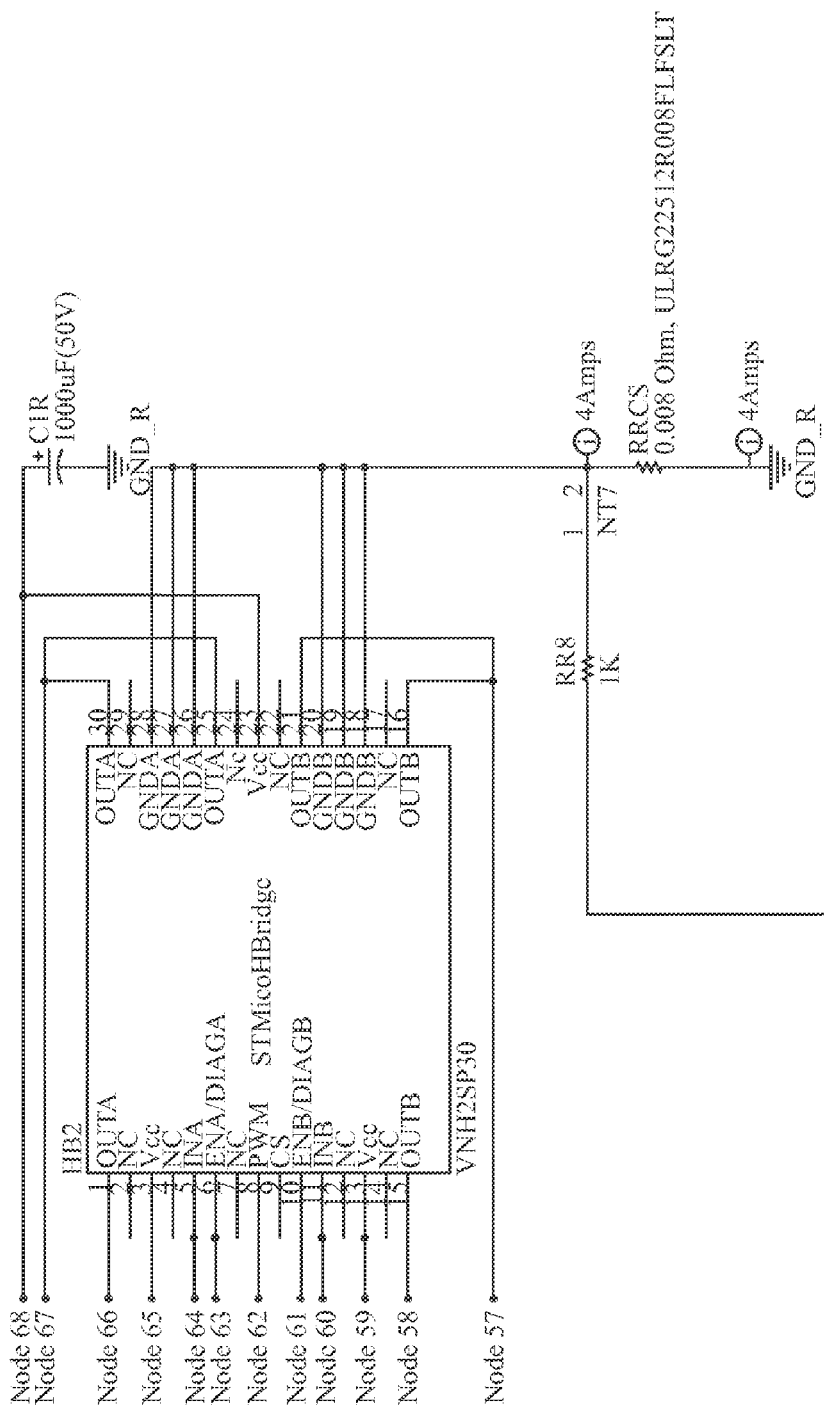
Figure 14L:
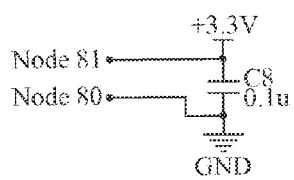
Figure 14L:
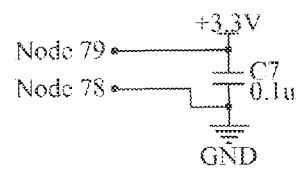
Figure 14L:
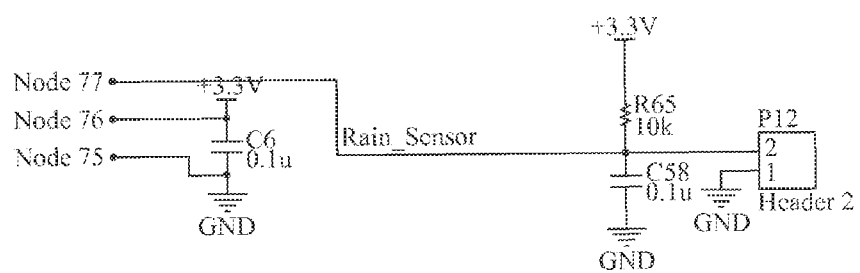
Figure 14L:
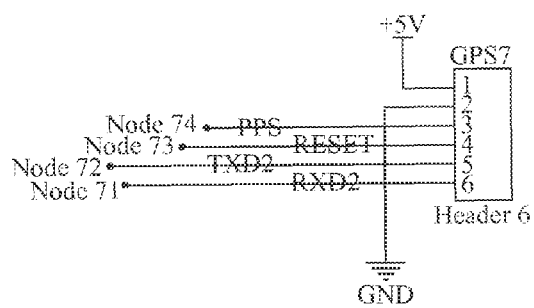
Figure 14M:
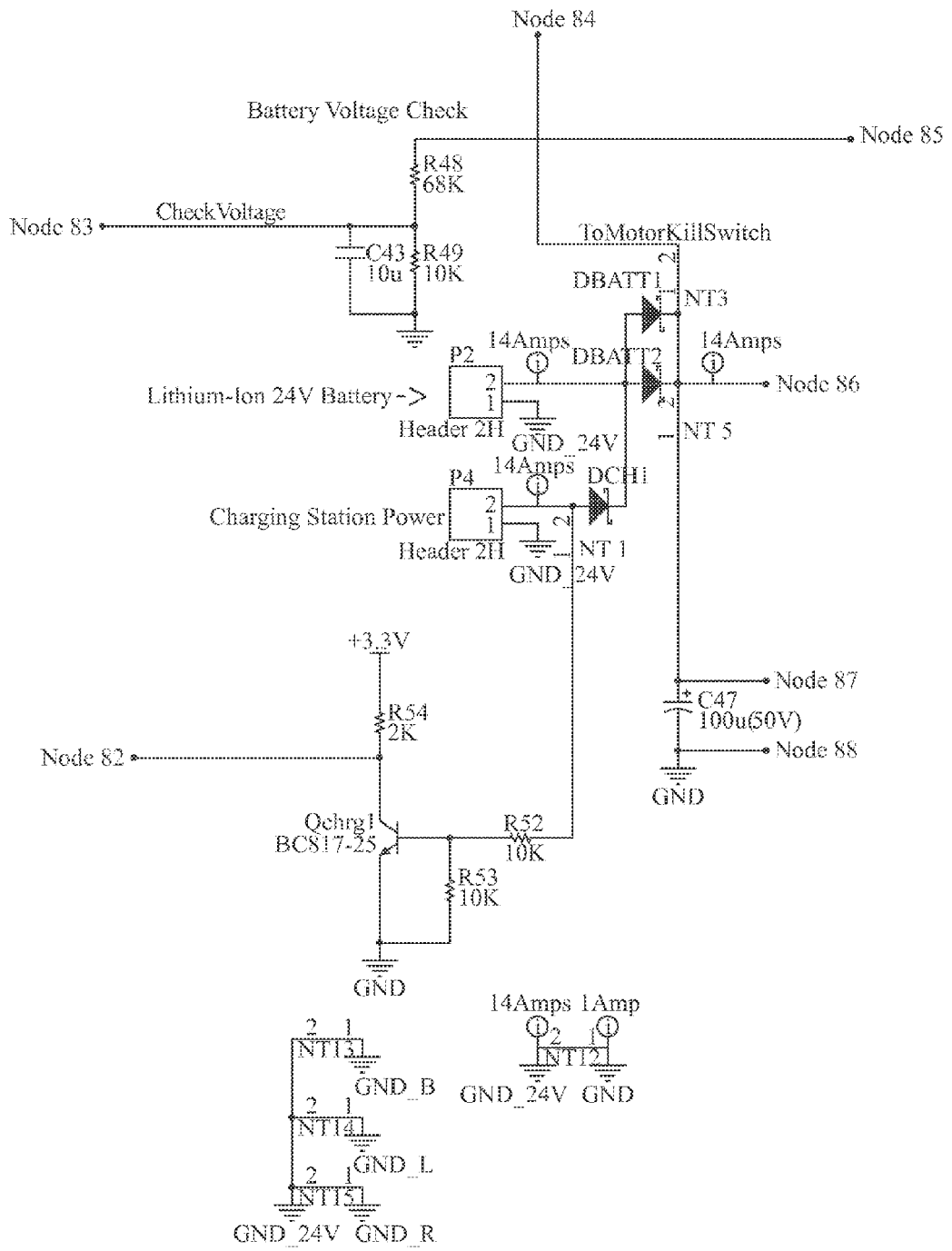
Figure 14N:
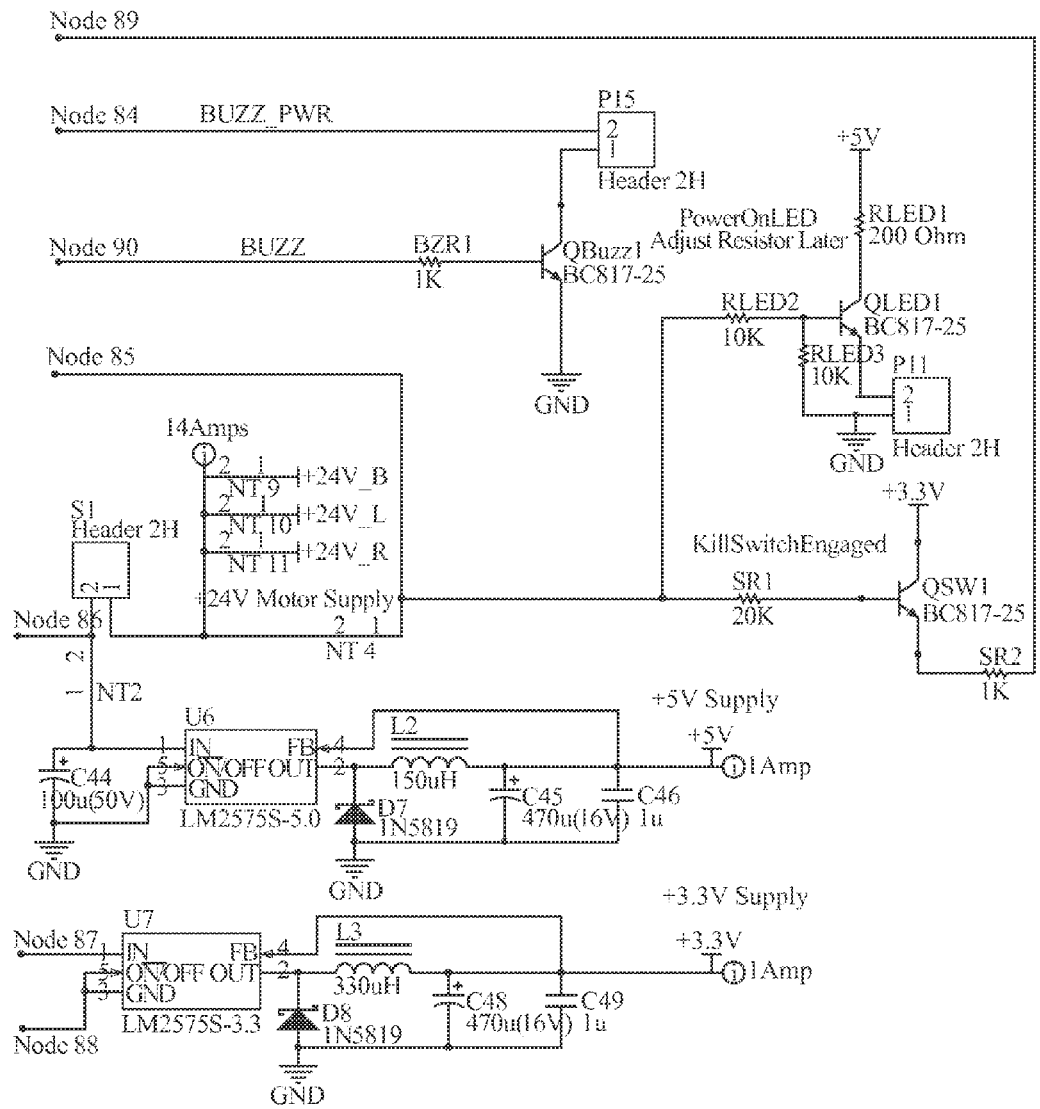
Figure 14O:
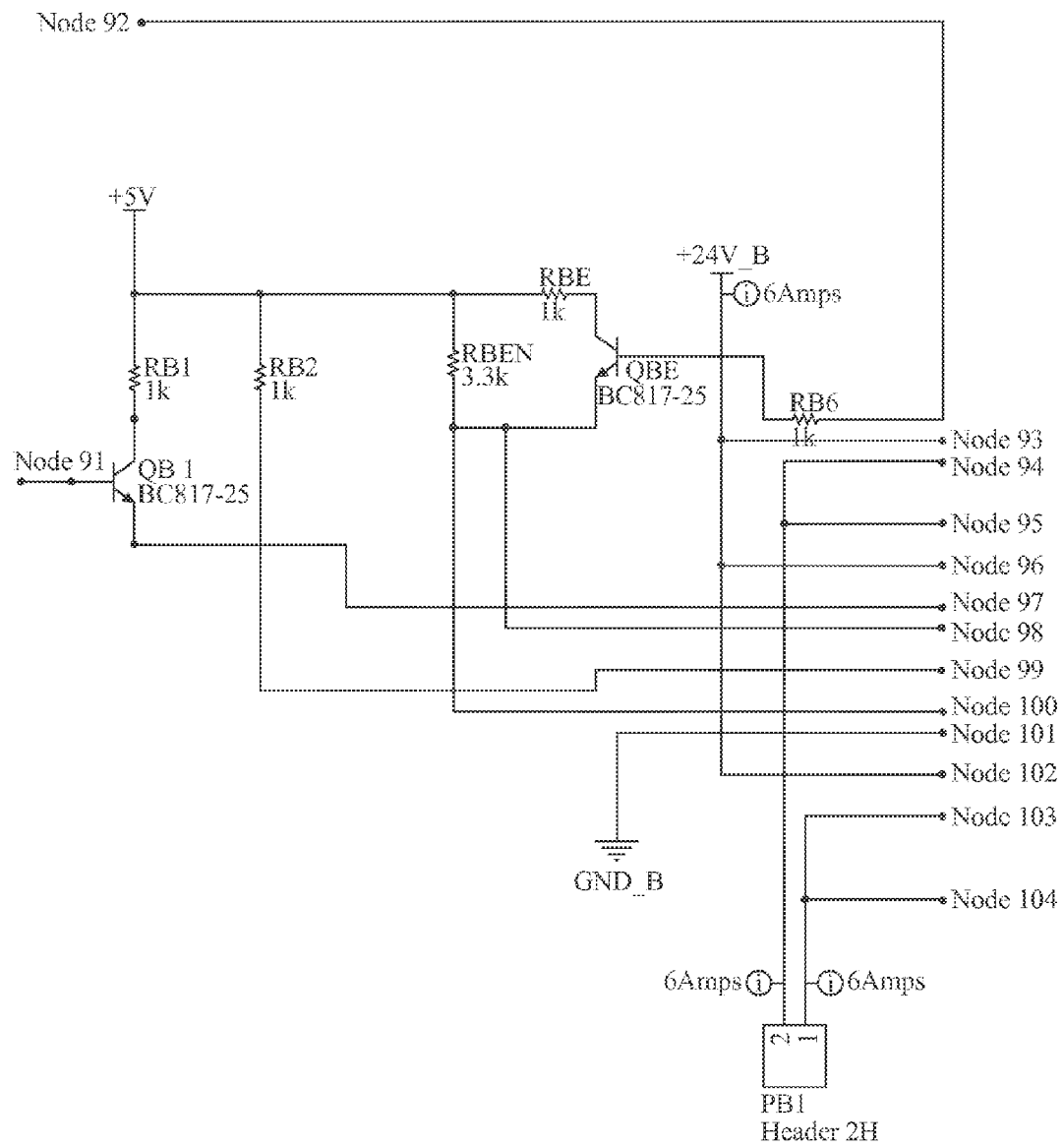
Figure 14Q:
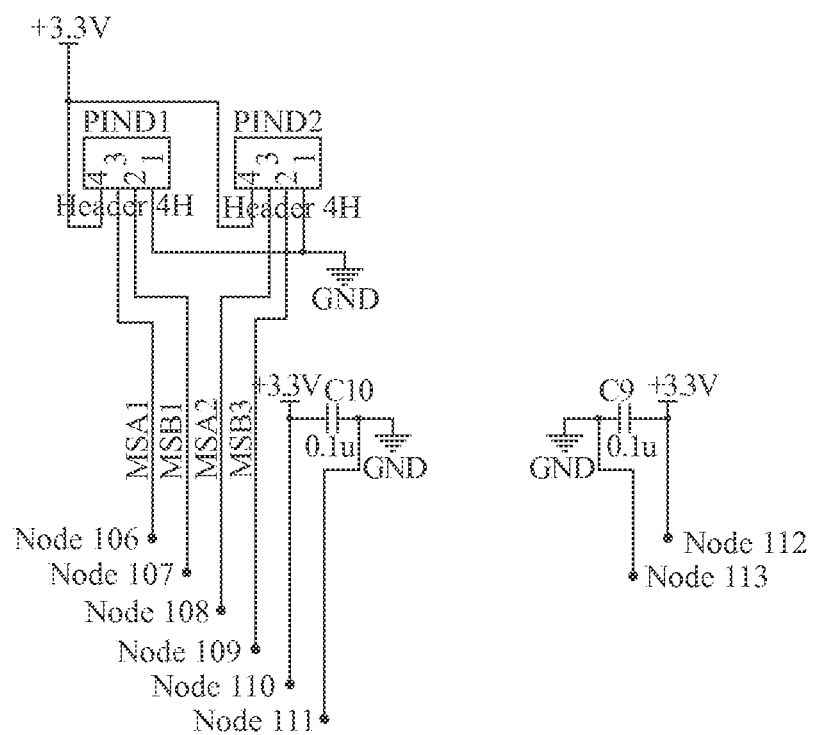

Referring to FIG. 14, an electrical schematic of a robot control system is illustrated. The electrical schematic of FIG. 14 shows all of the electrical components that are necessary to operate the autonomous robot 200 including the distance-traveled measuring mechanism, the directional indicating instrument, the memory device, the data receiving port and the central processing unit.

Figure 15:
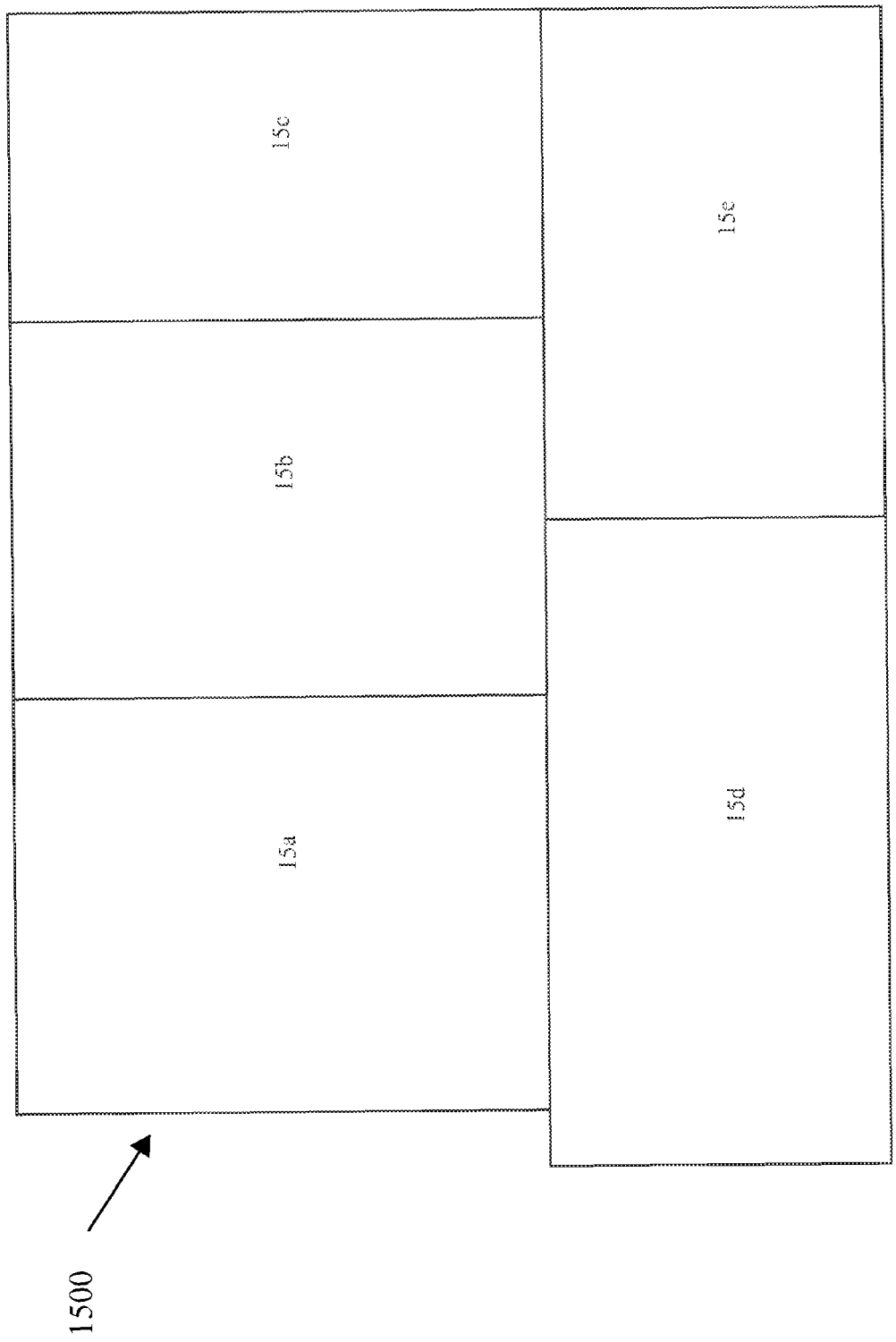
FIG. 15 is an electrical schematic of a hand-held remote control according to an embodiment of the present invention.
Figure 15A:
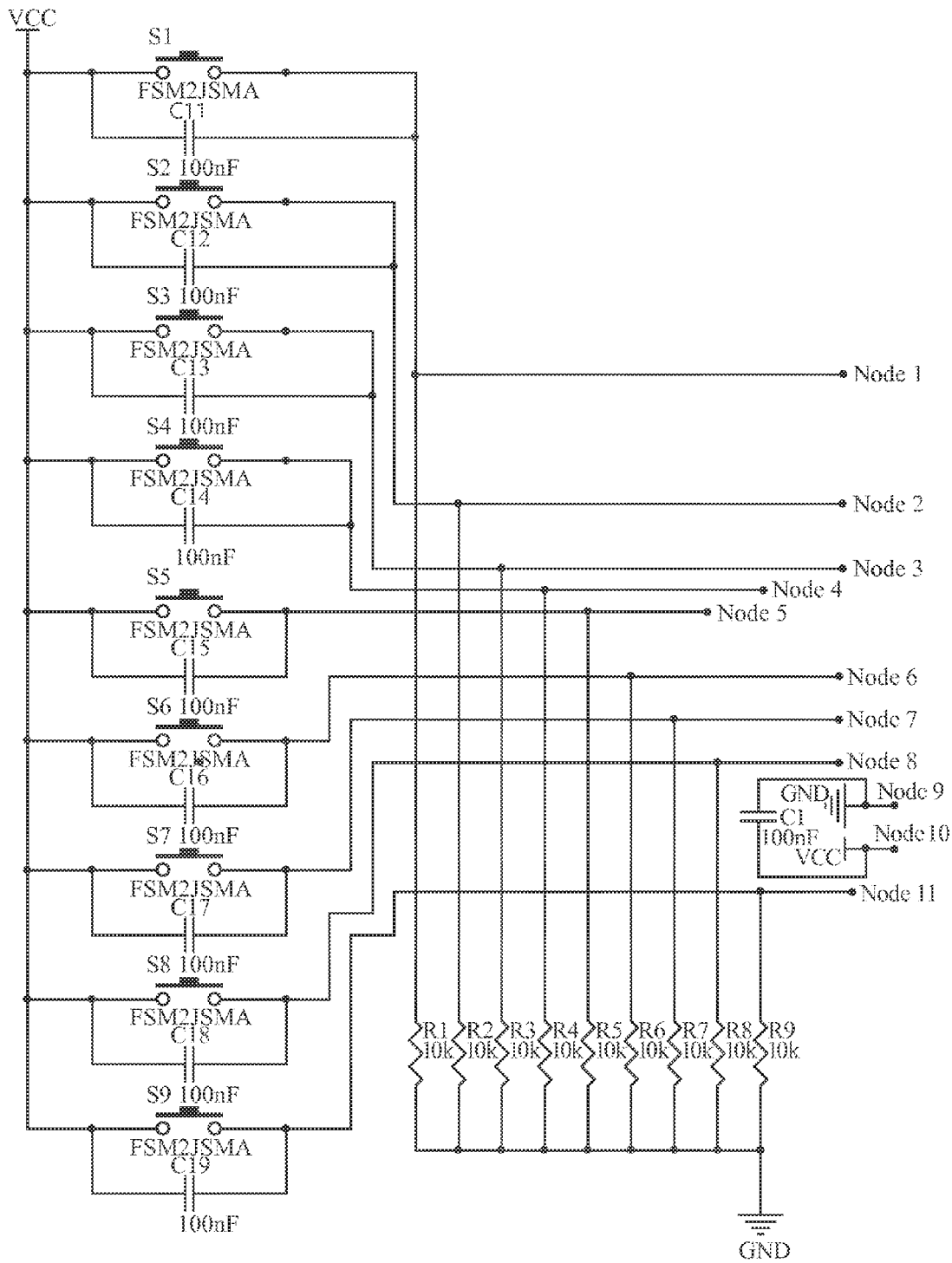
Figure 15B:
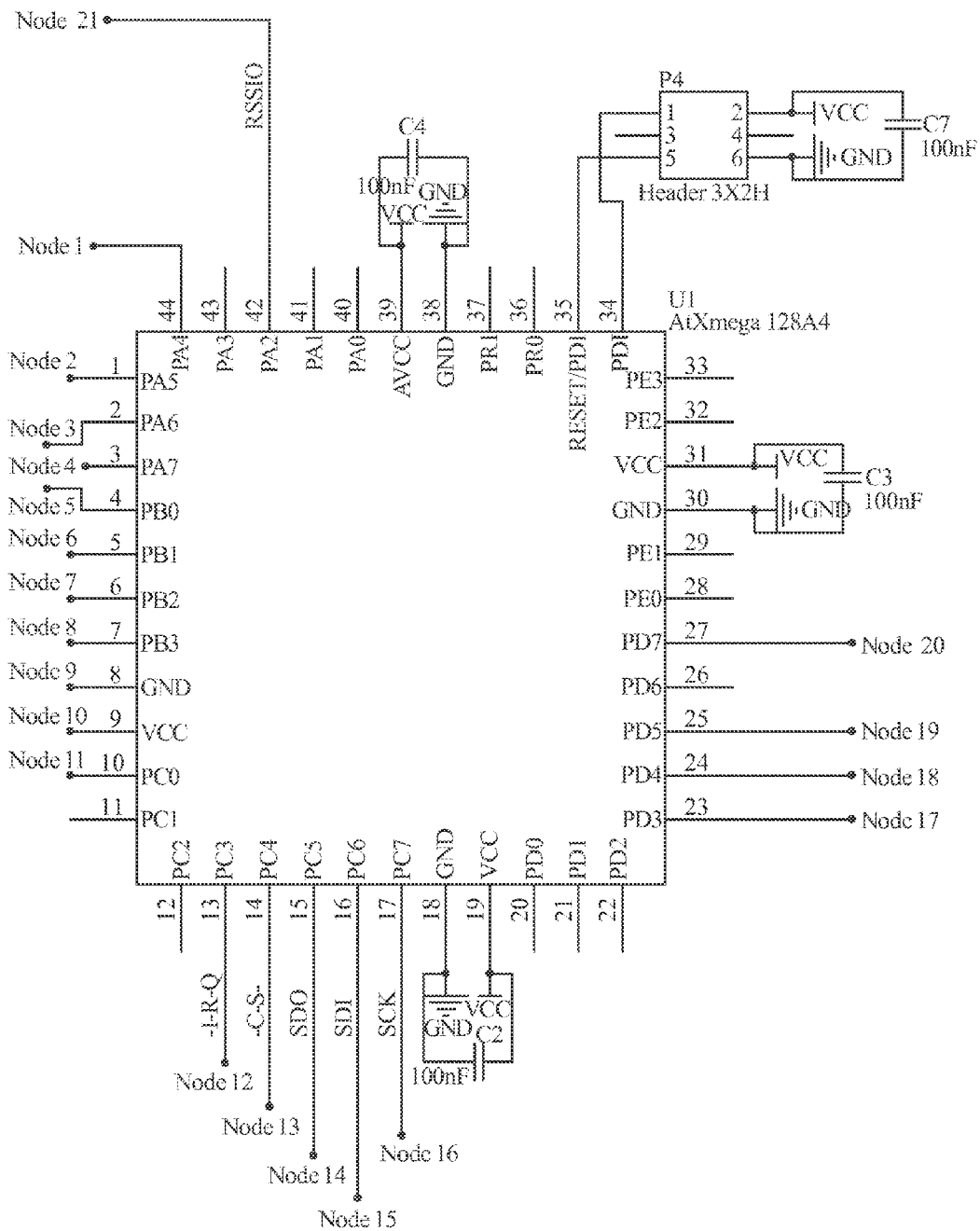
Figure 15C:
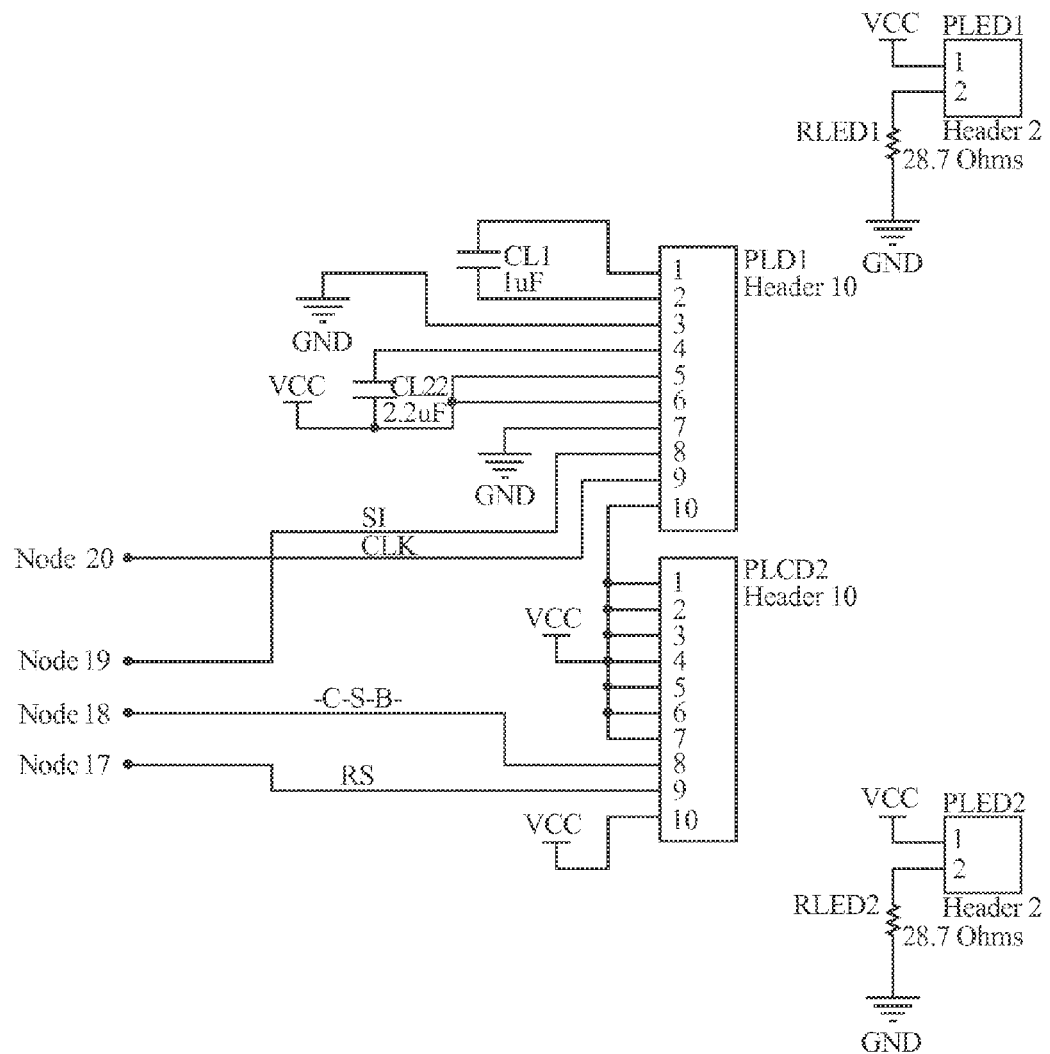
Figure 15D:
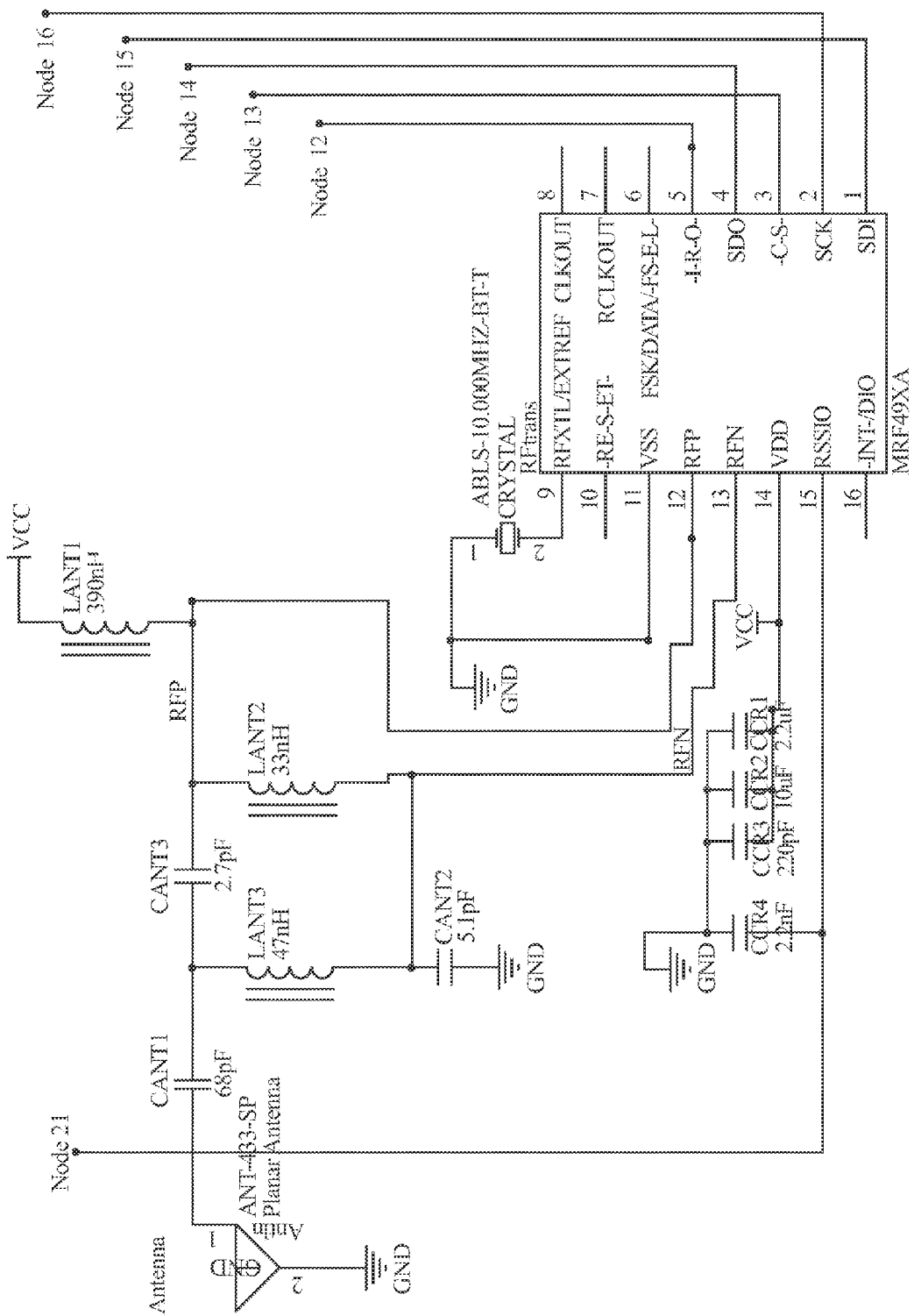
Figure 15E:
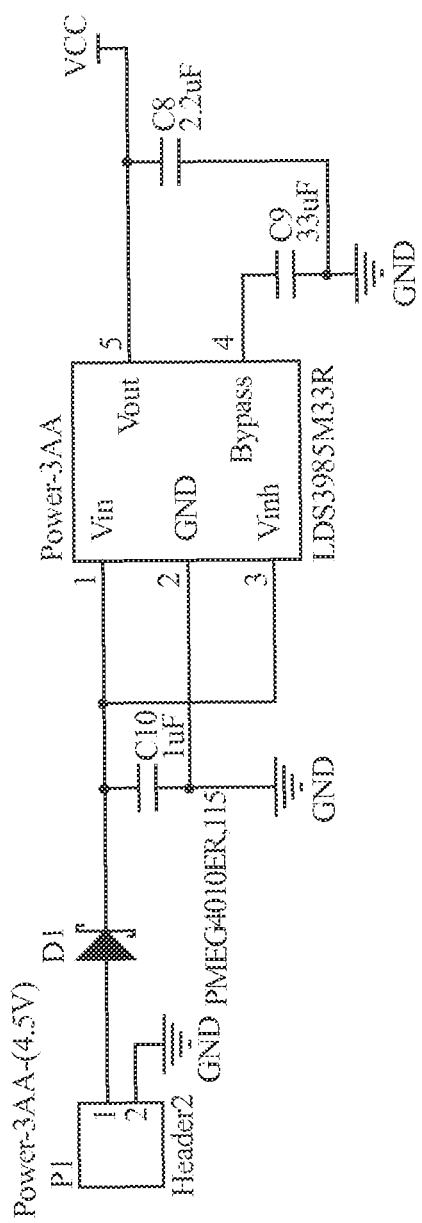
Figure 16A:
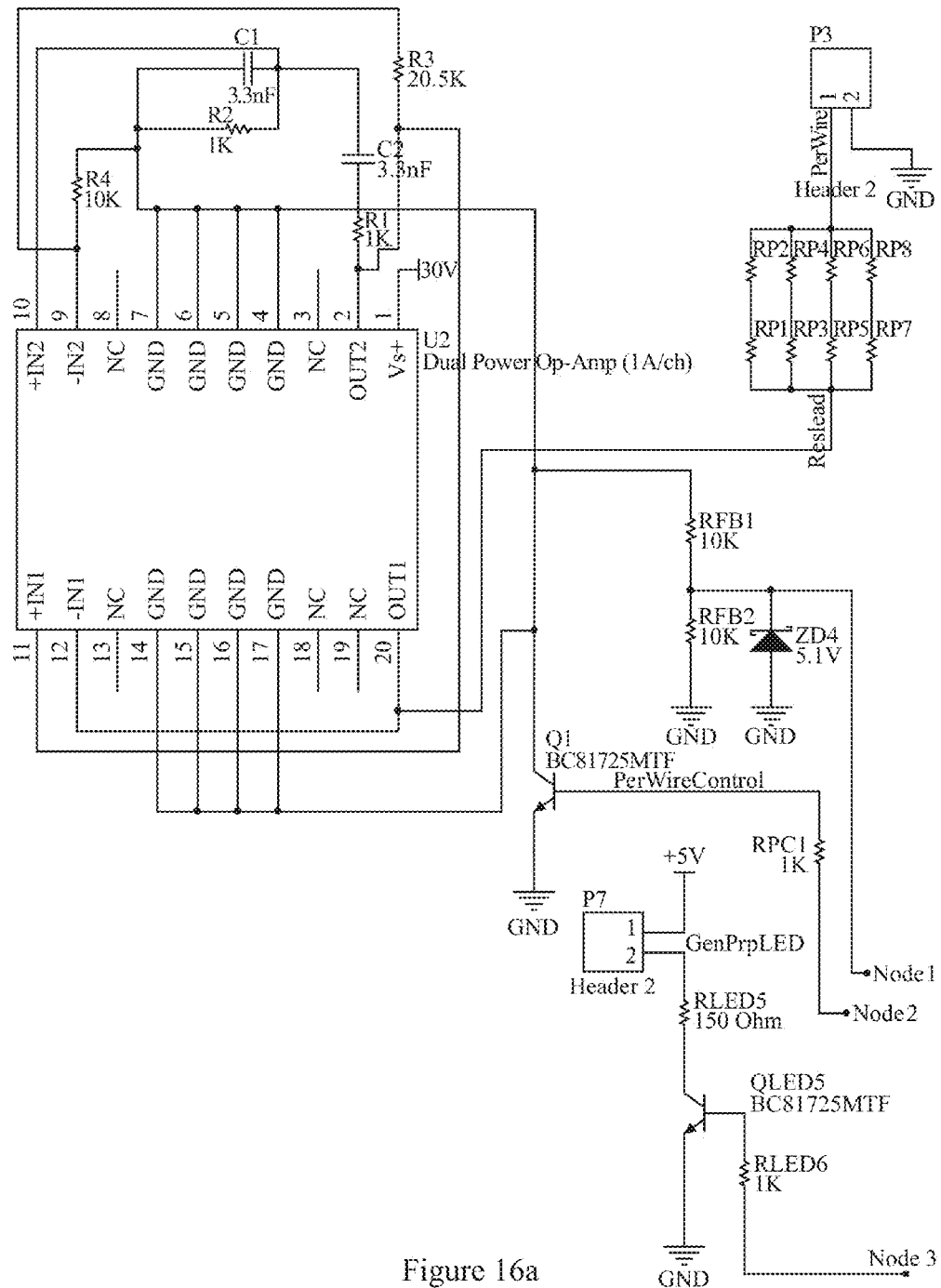
FIG. 16 is an electrical schematic of a charging unit according to an embodiment of the present invention.
Figure 16B:
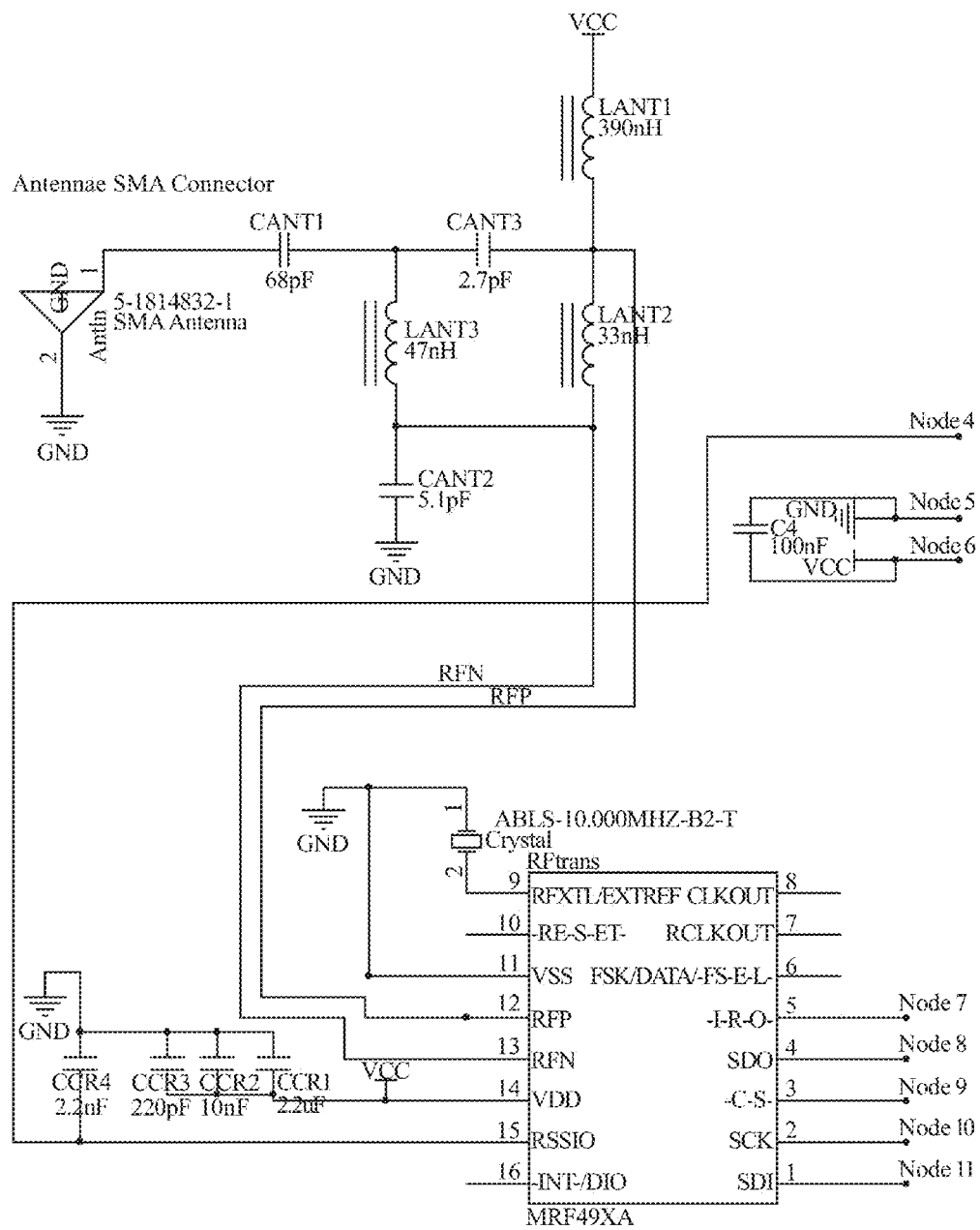
Figure 16C:
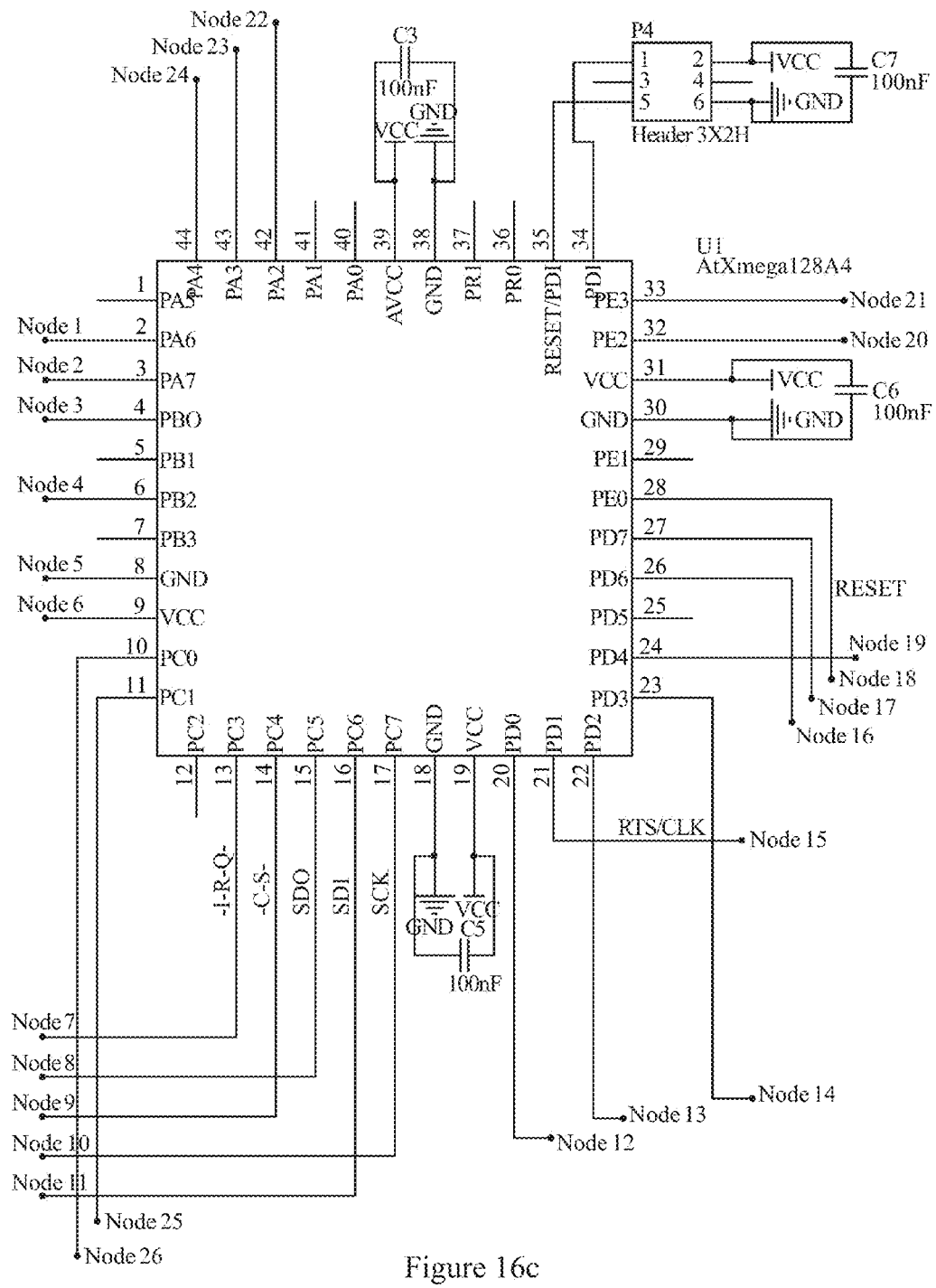
Figure 16D:
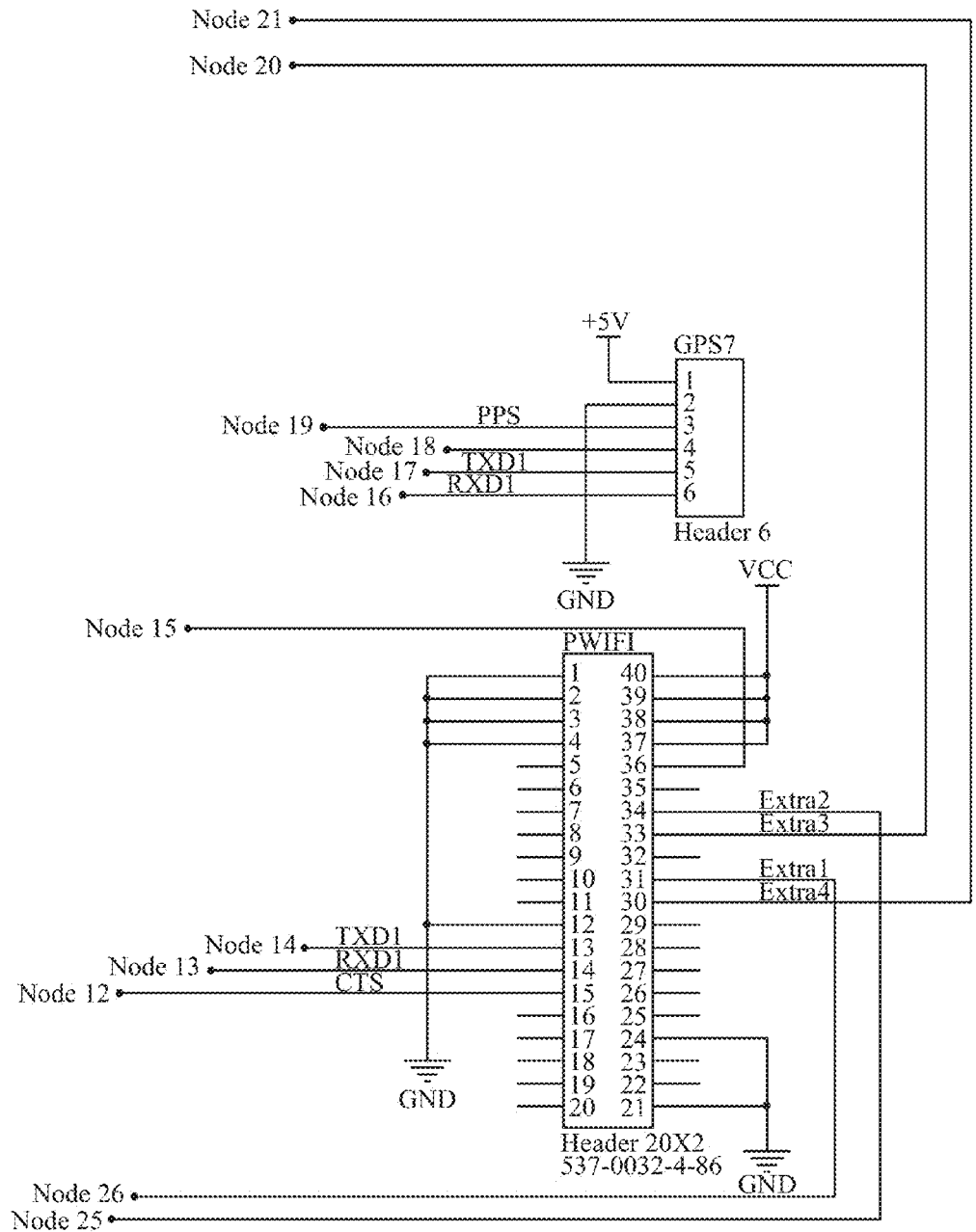
Figure 16E:
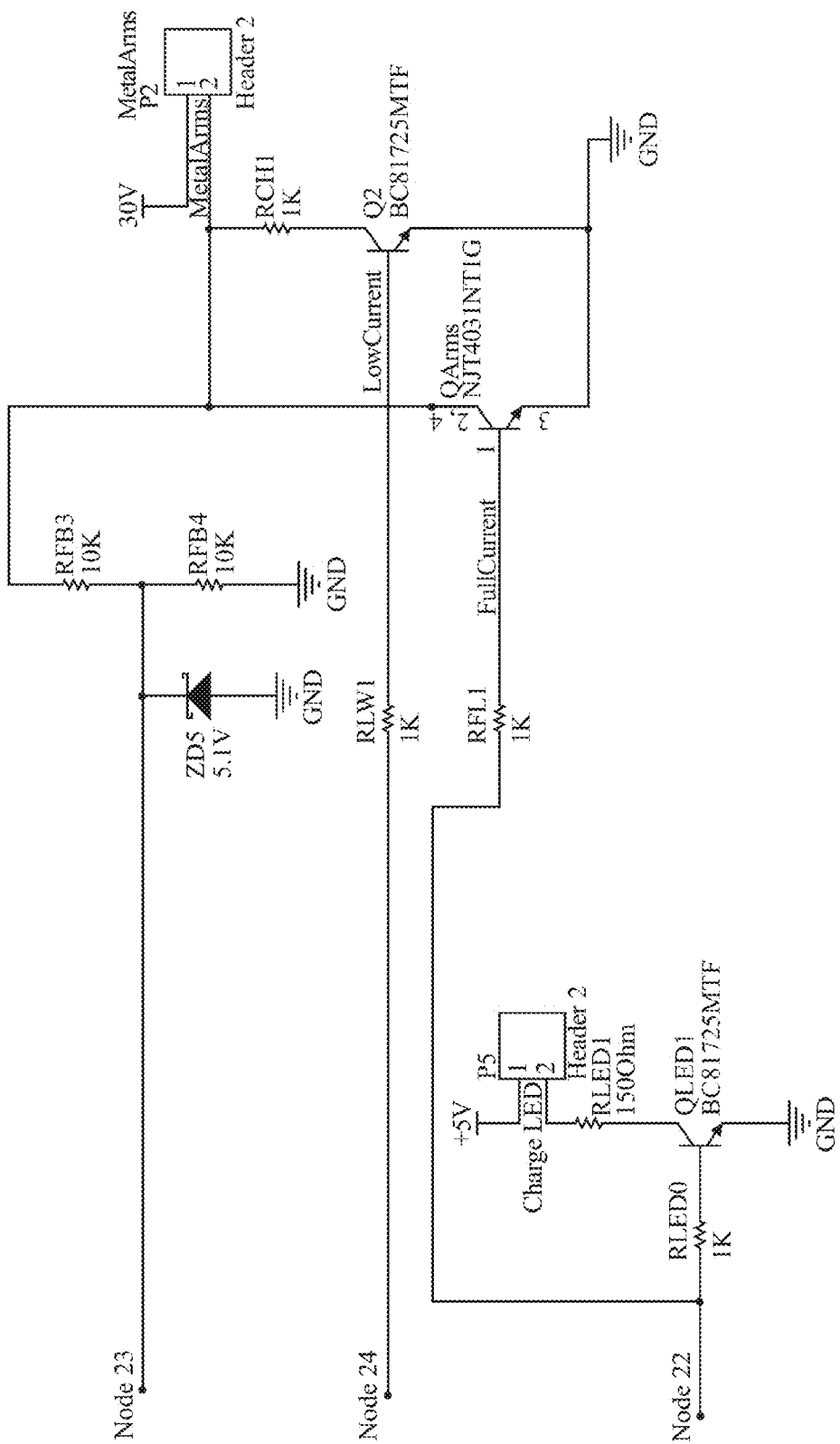
Figure 16F:
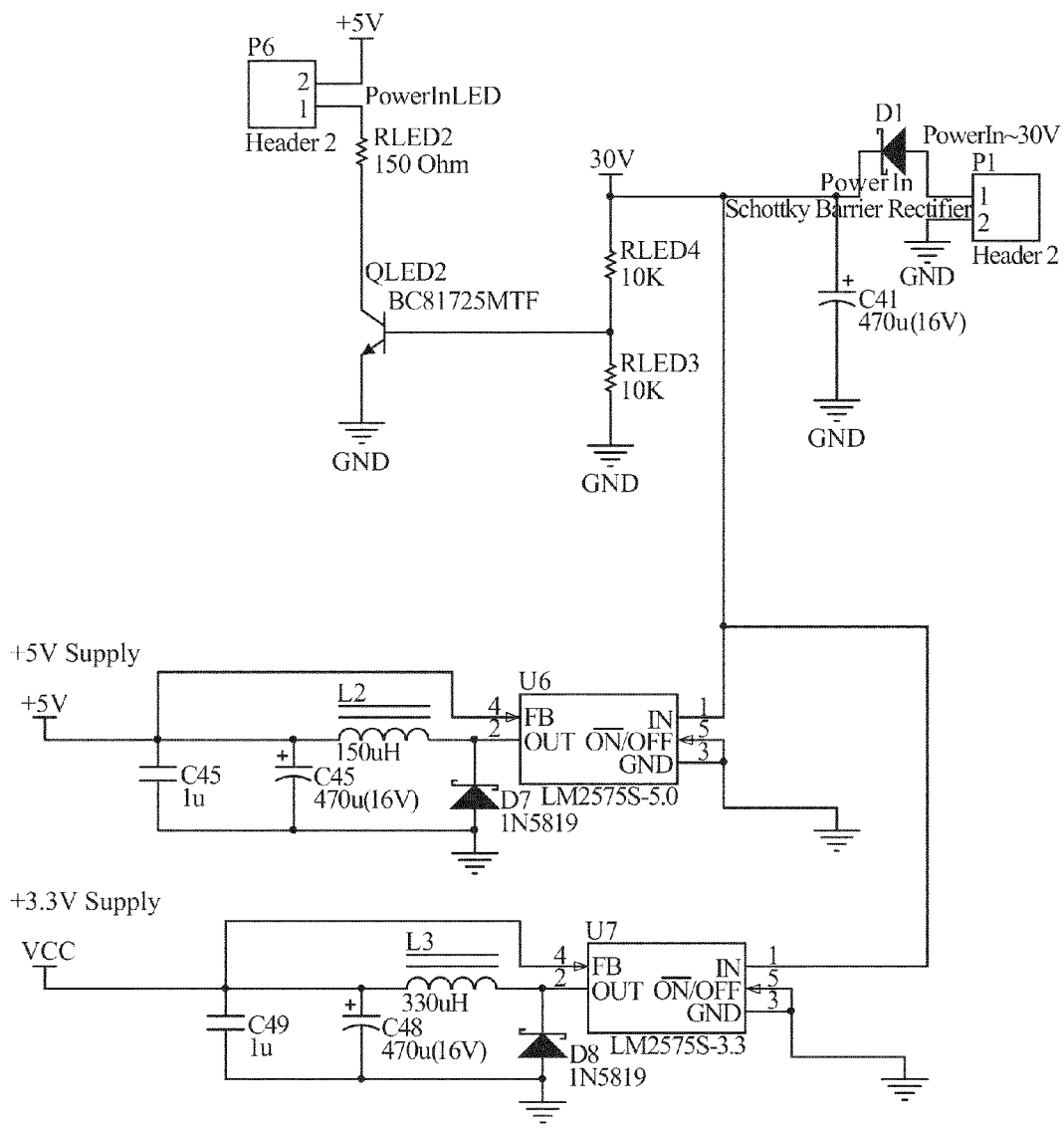

Referring to FIG. 15, an electrical schematic of a hand-held remote control that may be used to operate the autonomous robot 200 is illustrated. The hand-held remote control is capable of communicating with the data receiving port of the control system in order to maneuver the autonomous robot 200 around the perimeters as discussed above as well as to send the necessary signals to the autonomous robot 200 as discussed above.

Referring to FIG. 16, an electrical schematic of a charging unit that may be used to charge the batteries of the autonomous robot 200 is illustrated. The charging unit may be incorporated into the docking station 300. As such, the circuitry illustrated in FIG. 16 may be incorporated into the housing 301 of the docket station 300. Alternatively, the circuitry illustrated in FIG. 16 may be contained within a separate component such as, for example, a plug-and-play type of device.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A method of defining an area of confinement for an autonomous robot comprising;
    a) positioning the autonomous robot at a starting point $P_0$ and recording the starting point $P_0$ as a reference point within a memory device of the autonomous robot;
    b) moving the autonomous robot from the starting point $P_0$ about a perimeter of the area of confinement in a desired direction, wherein said movement of the autonomous robot is controlled by a user;
    c) continuously tracking location of the autonomous robot relative to the reference point $P_o$ during said movement using a distance-traveled measuring mechanism and a directional indicating instrument:
    d) recording the tracked location of the autonomous robot as a map in the memory device; and
    e) upon detecting that the map includes a dosed-geometry, defining the closed-geometry as the perimeter of the area of confinement within the memory device;
    wherein the area of confinement, is defined without marking the perimeter of the area of confinement with a physical barrier.

2. The method of claim I further comprising:
    f) positioning the autonomous robot at a point $P_1$ along a perimeter of an area of exclusion and recording the point $P_1$ as a location relative to the reference point $P_0$, wherein the point $P_1$ is located within the perimeter of the area of confinement;

g) moving the autonomous robot from the point $P_1$ about the perimeter of the area of exclusion in a desired direction, wherein said movement of the autonomous robot is controlled by the user;

h) continuously tracking location of the autonomous robot relative to the reference point $P_0$ during, said movement using a distance-traveled measuring mechanism and a directional indicating instrument; and i) recording; the tracked location of the autonomous robot as a portion of the map in the memory device.

3. The method of claim 2 wherein steps f) through i) are repeated at different locations within the area of confinement in order to define a plurality of areas of exclusion.

4. The method of claim 1 wherein recording the starting point $P_0$ as a reference point within the memory device of the autonomous robot is accomplished by the user sending a signal to the autonomous robot via a hand-held remote control, a PC, a PDA or a Smart Phone.

5. The method of claim 4 wherein the hand-held remote control, PC, PDA or Smart Phone connects to the autonomous robot via Wi-Fi and displays the map recorded in the memory device.

6. The method of claim wherein the starting point $P_0$ is stored within the memory device as a coordinate in an XY or X$\theta$ coordinate system, the coordinate becoming the reference point upon which all subsequent locations of the autonomous robot are based.

7. The method of claim 1 further comprising:
wherein the autonomous robot is configured to move at a constant velocity and the memory device is configured with an algorithm that enables the memory device to continuously record a current location of the autonomous robot with respect to the point $P_0$; and wherein the memory device records the tracked location as the map in terms of vectors having, a distance and an angle such that a mapping of any single vector is initiated by a substantial change in direction of the autonomous robot.

8. The method of claim 1, wherein step e) comprises the autonomous robot automatically recognizing when the map includes the closed-geometry and the area of confinement is defined by the autonomous robot prompting the user to confirm that the perimeter of the area of confinement has been properly established.

9. The method of claim 1 wherein the autonomous robot is a lawn mower and the area of confinement surrounds a yard.

10. An autonomous robot comprising:
a housing, a control system, and a plurality of drive wheels, the control system comprising a distance-traveled measuring mechanism, a directional indicating instrument, a memory device, a data receiving port for receiving signals from an external device, and a central processing unit; and the central processing unit configured to (1) track the location of the autonomous robot relative to a reference point based on output generated by the distance-traveled measuring mechanism and the directional indicating instrument during user-controlled movement of the autonomous robot around a perimeter of an area of confinement using the external device, wherein the perimeter of the area of confinement is not marked by a physical barrier; (2) record the tracked location of the autonomous robot as a map within the memory device; and (3) define a closed-geometry formed by the tracked location as the perimeter of the area of confinement within the memory device.

11. The autonomous robot of claim 10 wherein the distance-traveled measuring mechanism is a timer and the directional indicating instrument is a compass.

12. The autonomous robot of claim 10 wherein when the autonomous robot is located within the perimeter of the area of confinement and put into an operating mode, the autonomous robot performs a task without exiting the perimeter of the area of confinement, 13. The autonomous robot of claim 10 further comprising:
wherein the autonomous robot has four different modes including a setup mode, an exclusion area mode, a pattern selection mode and an operational mode, and wherein when the autonomous robot is in the setup mode, the perimeter of the area of confinement is defined within the memory device, 14. The autonomous robot of claim 13 wherein when the autonomous robot is in the exclusion area mode, the closed-geometry formed by the tracked location is defined as a perimeter of an area of exclusion within the memory device.

15. The autonomous robot of claim 13 wherein when the autonomous robot is in the pattern selection mode, a pattern of movement is defined for the autonomous robot to follow when the autonomous robot is in the operational mode and within the perimeter of the area of confinement.

16. The autonomous robot of claim 10 wherein the external device is one of a remote control, a PC, a PDA or a Smart Phone that communicates with the data receiving port via Wi-Fi, IR or RF communication.

17. The autonomous robot of claim 10 further comprising a docking station comprising a hollow housing that is sized and configured to contain the autonomous robot therein, the housing having an opening through which the autonomous robot can pass into the housing.

18. The autonomous robot of claim 17 wherein the clocking station serves as a communication gateway between the external device and the autonomous robot.

19. The autonomous robot of claim 17 wherein the docking, station serves as a battery charging, station for the autonomous robot.

20. A method of defining an area of confinement for an autonomous robot comprising;
a) positioning the autonomous robot at a starting point $P_0$ and recording the starting point $P_0$ as a reference point within a memory device of the autonomous robot, wherein the starting point $P_0$ is recorded upon the autonomous robot receiving a record. starting point signal from an eternal device;

b) moving the autonomous robot from the starting point $P_0$ about a perimeter of the area of confinement in a desired direction, wherein said movement of the autonomous robot is controlled by a user transmitting signals from the external device which enables the user to move and steer the autonomous robot in a desired direction;

c) continuously tracking location of the autonomous robot relative to the reference point $P_0$ during said movement;

d) recording the tracked location of the autonomous robot as a map in the memory device; and e) upon detecting that the map includes a closed-geometry, defining the closed-geometry as the perimeter of the area of confinement within the memory device.

* * * * *